US012361164B2

(12) United States Patent
Uzun et al.

(10) Patent No.: US 12,361,164 B2
(45) Date of Patent: Jul. 15, 2025

(54) PRIVACY-PRESERVING FUZZY QUERY SYSTEM AND METHOD

(71) Applicant: Georgia Tech Research Corporation, Atlanta, GA (US)

(72) Inventors: Erkam Uzun, Atlanta, GA (US); Alexandra Boldyreva, Atlanta, GA (US); Pak Ho Chung, Atlanta, GA (US); Vladimir Kolesnikov, Atlanta, GA (US); Wenke Lee, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 366 days.

(21) Appl. No.: 18/015,910

(22) PCT Filed: Jul. 15, 2021

(86) PCT No.: PCT/US2021/041777
§ 371 (c)(1),
(2) Date: Jan. 12, 2023

(87) PCT Pub. No.: WO2022/015948
PCT Pub. Date: Jan. 20, 2022

(65) Prior Publication Data
US 2023/0289469 A1    Sep. 14, 2023

Related U.S. Application Data

(60) Provisional application No. 63/052,201, filed on Jul. 15, 2020.

(51) Int. Cl.
*G06F 7/04*     (2006.01)
*G06F 21/32*    (2013.01)
(Continued)

(52) U.S. Cl.
CPC ......... *G06F 21/6245* (2013.01); *G06F 21/32* (2013.01); *G06F 21/6227* (2013.01)

(58) Field of Classification Search
CPC ... G06F 21/6245; G06F 21/32; G06F 21/6237
(Continued)

(56) References Cited

U.S. PATENT DOCUMENTS 9,749,128 B2    8/2017  Calapodescu et al.
2009/0287837 A1   11/2009  Felsher
(Continued)

OTHER PUBLICATIONS

Barni, et al., Privacy-preserving fingercode authentication. In Proceedings of the 12th ACM workshop on Multimedia and security. (2010) 231-240.

(Continued)

*Primary Examiner* — Jeffrey C Pwu
*Assistant Examiner* — Samuel Ambaye
(74) *Attorney, Agent, or Firm* — Meunier Carlin & Curfman LLC

(57) ABSTRACT

An exemplary system and method are disclosed that provide the private querying of a biometric scan, such as a person's photo, against a private database such that the client issuing the private query learns only the identity of the query if it is in the database while the server performing the processing learns nothing of the biometric scan. The exemplary system and method conduct privacy-preserving searches over fuzzy databases via a fuzzy labeled set intersection (FLPSI) protocol. FLPSI protocol computes an intersection of noisy input sets to assess for closeness/similarity metrics in an efficient and optimized search.

20 Claims, 6 Drawing Sheets

(51) Int. Cl.
  *G06F 21/62* (2013.01)
  *H04N 7/16* (2011.01)
(58) Field of Classification Search
  USPC .......................................................... 726/28
  See application file for complete search history.

(56) References Cited

U.S. PATENT DOCUMENTS

| | | | |
|---|---|---|---|
| 2010/0169342 A1 | 7/2010 | Kenedy et al. | |
| 2010/0281269 A1 | 11/2010 | Kindarji et al. | |
| 2014/0189364 A1* | 7/2014 | Kolesnikov | G06F 12/1408 713/189 |
| 2015/0269394 A1* | 9/2015 | Bringer | H04L 63/0861 726/26 |
| 2016/0119119 A1* | 4/2016 | Calapodescu | G06F 21/6227 380/30 |
| 2018/0330179 A1 | 11/2018 | Streit | |
| 2019/0058593 A1* | 2/2019 | Polcha | H04L 9/3231 |
| 2020/0044852 A1* | 2/2020 | Streit | G06F 21/32 |

OTHER PUBLICATIONS

Boldyreva and Chenette. Efficient fuzzy search on encrypted data. In International Workshop on Fast Software Encryption. Springer, 2014, 613-633.
Bowyer et al., Image understanding for iris biometrics: A survey. Computer vision and image understanding 110, 2 (2008), 281-307.
Brakerski, et al., (Leveled) fully homomorphic encryption without bootstrapping. ACM Transactions on Computation Theory (TOCT) 6, 3 (2014), 1-36.
Charikar. 2002. Similarity estimation techniques from rounding algorithms. In Proceedings of the thirty-fourth annual ACM symposium on Theory of computing. 380-388.
Chase, et al. Security of homomorphic encryption. Homomorphic Encryption.org, Redmond WA, Tech. Rep (2017).
Chen et al., SANNS: Scaling Up Secure Approximate k-Nearest Neighbors Search. In 29th USENIX Security Symposium (USENIX Security 20). USENIX Association, Boston, MA. 2020. https://www.usenix.org/conference/usenixsecurity20/presentation/chen-hao.
Chen, Hao et al., Simple encrypted arithmetic library v2. 3.0. Microsoft (2017).
Chen, Hao et al., Labeled PSI from Fully Homomorphic Encryption with Malicious Security. In Proceedings of the 2018 ACM SIGSAC Conference on Computer and Communications Security. ACM, 1223-1237.
Chen, Hao et al., Fast private set intersection from homomorphic encryption. In Proceedings of the 2017 ACM SIGSAC Conference on Computer and Communications Security. ACM, 1243-1255.
Chmielewski and Hoepman. Fuzzy private matching. In 2008 Third International Conference on Availability, Reliability and Security. IEEE, 327-334.
Dowson and Landau. The Fréchet distance between multivariate normal distributions. Journal of multivariate analysis 12, 3 (1982), 450-455.
Erkin, Zekeriya. Privacy-preserving face recognition. In International symposium on privacy enhancing technologies symposium. Springer, 2009, 235-253.
Evans, David et al., A Pragmatic Introduction to Secure Multi-Party Computation. Foundations and Trends® in Privacy and Security 2, 2-3 (2018), 70-246. https://doi.org/10.1561/3300000019.
Fan and Vercauteren. Somewhat Practical Fully Homomorphic Encryption. IACR Cryptology ePrint Archive 2012 (2012), 144.
Fredrikson, Matt et al., Model inversion attacks that exploit confidence information and basic countermeasures. In Proceedings of the 22nd ACM SIGSAC Conference on Computer and Communications Security. 2015. 1322-1333.
Freedman, Michael J. et al., Keyword search and oblivious pseudorandom functions. In Theory of Cryptography Conference. Springer, 2005, 303-324.
Freedman, Michael J. et al., Efficient private matching and set intersection. In International conference on the theory and applications of cryptographic techniques. Springer, 2004, 1-19.
Guo, Yandong et al., Msceleb-1m: A dataset and benchmark for large-scale face recognition. In European Conference on Computer Vision. Springer, 2016, 87-102.
Huang, Yan et al., Efficient privacy-preserving biometric identification. In Proceedings of the 17th conference Network and Distributed System Security Symposium, NDSS, vol. 68, 2011.
Indyk and Woodruff. Polylogarithmic private approximations and efficient matching. In Theory of Cryptography Conference. Springer, 2006, 245-264.
Ion, Mihaela et al., Private Intersection-Sum Protocol with Applications to Attributing Aggregate Ad Conversions. IACR Cryptology ePrint Archive 2017 (2017), 738.
Jarecki and Liu. 2010. Fast secure computation of set intersection. In International Conference on Security and Cryptography for Networks. Springer, 418-435.
Ji, Jianqiu et al., Super-bit locality-sensitive hashing. In Advances in Neural Information Processing Systems. 2012. 108-116.
Karras, Tero et al., A style-based generator architecture for generative adversarial networks. arXiv preprint arXiv:1812.04948 (2018).
Kulis and Grauman. Kernelized locality-sensitive hashing for scalable image search. In 2009 IEEE 12th international conference on computer vision. IEEE, 2130-2137.
Kuzu, Mehmet et al., Efficient Similarity Search over Encrypted Data. In 2012 IEEE 28th International Conference on Data Engineering. 1156-1167.
Lowe, David G. Object recognition from local scale-invariant features. In Proceedings of the seventh IEEE international conference on computer vision, vol. 2. Ieee, 1 999, 1150-1157.
Meijering, Erik. A chronology of interpolation: from ancient astronomy to modern signal and image processing. Proc. IEEE 90, 3 (2002), 319-342.
Osadchy, Margarita et al., SciFI—a system for secure face identification. In 2010 IEEE Symposium on Security and Privacy. IEEE, 239-254.
Pinkas, Benny et al., Phasing: Private set intersection using permutation-based hashing. In 24th {USENIX} Security Symposium ({USENIX} Security 15). 2015. 515-530.
Resende and Aranha. Faster unbalanced private set intersection. In International Conference on Financial Cryptography and Data Security. Springer, 2018, 203-221.
Riazi, M. Sadegh et al., Sub-linear Privacy-preserving Search with Untrusted Server and Semi-honest Parties. CoRR abs/1612.01835 (2016). http://arxiv.org/abs/1612.01835.
Sadeghi, Ahmad-Reza et al., Efficient privacy-preserving face recognition. In International Conference on Information Security and Cryptology. Springer, 2009, 229-244.
Schroff, Florian et al., FaceNet: A unified embedding for face recognition and clustering. In Proceedings of the IEEE conference on computer vision and pattern recognition. 2015. 815-823.
SEAL 2019. Microsoft SEAL (release 3.2). https://github.com/Microsoft/SEAL. (Feb. 2019). Microsoft Research, Redmond, WA.
Shamir, Adi. How to share a secret. Commun. ACM 22, 11 (1979), 612-613.
Shokri, Reza et al., Membership inference attacks against machine learning models. In 2017 IEEE Symposium on Security and Privacy (SP). IEEE, 3-18.
Simhadri, Sailesh et al., Cryptographic Authentication from the Iris. In International Conference on Information Security. Springer, 2019, 465-485.
Smart and Vercauteren. Fully homomorphic SIMD operations. Designs, codes and cryptography 71, 1 (2014), 57-81.
Songhori, Ebrahim M et al., Compacting privacy-preserving k-nearest neighbor search using logic synthesis. In 2015 52nd ACM/EDAC/IEEE Design Automation Conference (DAC). IEEE, 1-6.
Szegedy, Christian et al., Inception-v4, inception-resnet and the impact of residual connections on learning . . . In AAAI, 2017, vol. 4. 12, 4278-4284.
Mola and Jones. Robust real-time face detection. International journal of computer vision 57, 2 (2004), 137-154.

(56) References Cited

OTHER PUBLICATIONS

Wang, Qian et al., CloudBI: Practical privacy-preserving outsourcing of biometric identification in the cloud. In European Symposium on Research in Computer Security. Springer, 2015, 186-205.
Wang, Xiao et al., EMP-toolkit: Efficient MultiParty computation toolkit. https://github.com/emp-toolkit. (2016).
Wolf, Lior et al., Face recognition in unconstrained videos with matched background similarity. In Computer Vision and Pattern Recognition (CVPR), 2011 IEEE Conference on. IEEE, 529-534.
Yao, Andrew Chi-Chih. How to generate and exchange secrets. In 27th Annual Symposium on Foundations of Computer Science (sfcs 1986). IEEE, 1986, 162-167.
Ye, Qingsong et al., Efficient fuzzy matching and intersection on private datasets. In International Conference on Information Security and Cryptology. Springer, 2009, 211-228.
Yi, Xinyang et al., Binary embedding: Fundamental limits and fast algorithm. In International Conference on Machine Learning. 2015, 2162-2170.
Yuan and Yu. Efficient privacy-preserving biometric identification in cloud computing. In 2013 Proceedings IEEE Infocom. IEEE, 2652-2660.
Zhang, Chuan et al., PTBI: An efficient privacy-preserving biometric identification based on perturbed term in the cloud. Information Sciences 409 (2017), 56-67.
Zhang, Kaipeng et al., Joint face detection and alignment using multitask cascaded convolutional networks. IEEE Signal Processing Letters 23, 10 (2016), 1499-1503.
Zhu, Liehuang et al., An efficient and privacy-preserving biometric identification scheme in cloud computing. IEEE Access 6 (2018), 19025-19033.
Zhu, Youwen et al., Collusion-resisting secure nearest neighbor query over encrypted data in cloud, revisited. In 2016 IEEE/ACM 24th International Symposium on Quality of Service (IWQOS). IEEE, 1-6.
Albrecht, M. R. et al., On the concrete hardness of learning with errors. Journal of Mathematical Cryptology, 9(3):169-203, 2015.
Android Open Source Project. Biometric security, 2020. https://source.android.com/security/biometric/measure.
Babenko and Lempitsky. Efficient indexing of billion-scale datasets of deep descriptors. In IEEE CVPR, 2016.
Blanton and Gasti. Secure and efficient protocols for iris and fingerprint identification. In ESORICS. Springer, 2011, 190-209.
Brakerski, Z. et al., Packed ciphertexts in LWE-based homomorphic encryption. In International Workshop on Public Key Cryptography, pp. 1-13. Springer, 2013.
Holmes, Aaron. Business Insider. https://www.businessinsider.com/senate-bill-sanders-merkley-ban-corporate-facial-recognition-without-consent-2020-8. Aug. 4, 2020.
Canetti, R. et al., Reusable fuzzy extractors for low-entropy distributions. In EUROCRYPT, 2016, 117-146.
Demmler, D., et al., Aby—a framework for efficient mixed-protocol secure two-party computation. In NDSS, 2015.
Dodis, Y., et al., Fuzzy extractors: How to generate strong keys from biometrics and other noisy data. In EUROCRYPT, 2004.
Dong, Z. et al., Deep CNN based binary hash video representations for face retrieval. Pattern Recognition, Elsevier, 81, 2018, 357-369.
Ducas and Stehle. Sanitization of FHE ciphertexts. In Annual International Conference on the Theory and Applications of Cryptographic Techniques, pp. 294-310. Springer, 2016.
Feigenbaum, J. et al., Secure multiparty computation of approximations. ACM Trans. Algorithms, 2(3):435-472, Jul. 2006.
Gentry, C., et al., Homomorphic evaluation of the AES circuit. In Annual Cryptology Conference, pp. 850-867. Springer, 2012.
Gilad-Bachrach, R. et al., Cryptonets: Applying neural networks to encrypted data with high throughput and accuracy. In International Conference on Machine Learning, pp. 201-210. PMLR, 2016.
Grother, P. et al., Face recognition vendor test (frvt) part 2: Identification. NIST, 2019.
Huang, Y. et al., Faster secure two-party computation using garbled circuits. In USENIX, pp. 331-335, 2011.
Indyk and Motwani. Approximate nearest neighbors: towards removing the curse of dimensionality. In Proceedings of the thirtieth annual ACM symposium on Theory of computing, pp. 604-613, 1998.
Ji, R., et al., Toward optimal manifold hashing via discrete locally linear embedding. IEEE Transactions on Image Processing, 26(11):5411-5420, 2017.
Karras, T. et al., A style-based generator architecture for generative adversarial networks. In CVPR, pp. 4401-4410, 2019.
Kolesnikov, V. et al., Efficient batched oblivious PRF with applications to private set intersection. In CCS, 2016, 818-829.
Microsoft. Biometric requirements, 2020. https://docs.microsoft.com/en-us/windows-hardware/design/device-experiences/windows-hello-biometric-requirements.
Norouzi, M. et al., Hamming distance metric learning. In Advances in neural information processing systems, pp. 1061-1069, 2012.
Pinkas, B. et al., Efficient circuit-based PSI via cuckoo hashing. In EUROCRYPT, 2018, 125-157.
Pinkas, B. et al., Faster private set intersection based on fOTg extension. In 23rd fUSENIXg Security Symposium (fUSENIXg Security 14), pp. 797-812, 2014.
Raginsky and Lazebnik. Locality-sensitive binary codes from shift-invariant kernels. Advances in neural information processing systems, 22:1509-1517, 2009.
Samaria and Harter. Parameterisation of a stochastic model for human face identification. In IEEE WACV, 1994, 138-142.
Microsoft SEAL (release 3.5). https://github.com/Microsoft/SEAL, Aug. 2020. Microsoft Research, Redmond, WA.
Su, J. et al., One pixel attack for fooling deep neural networks. IEEE TEVC, 2019.
Sabbagh, D., South Wales police lose facial recognition case. The Guardian. https://www.theguardian.com/technology/2020/aug/11/south-wales-police-lose-landmark-facial-recognition-case, Jun. 2020.
Kofman, A., Face recognition is now being used in schools, but it won't stop mass shootings. The Intercept. https://theintercept.com/2018/05/30/face-recognition-schools-school-shootings/, Dec. 2020.
Hill, K., The secretive company that might end privacy as we know it. The NYT. https://www.nytimes.com/2020/01/18/technology/clearview-privacy-facial-recognition.html, Jun. 2020.
Brandom, R., The Verge. Moscow's facial recognition system can be hijacked. https://www.theverge.com/2020/11/11/21561018/moscows-facial-recognition-system-crime-bribe-stalking, Dec. 2020.
Uzun, E. et al., Cryptographic key derivation from biometric inferences for remote authentication. In ASIACCS, 2021.
Vizilter, Y. et al., Realtime face identification via CNN and boosted hashing forest. In IEEE CVPR Workshops, pp. 78-86, 2016.
Wang, J. et al. A survey on learning to hash. IEEE TPAMI, 40(4):769-790, 2017.
Yasuda, M. Secure hamming distance computation for biometrics using ideal-lattice and ring-LWE homomorphic encryption. Information Security Journal: A Global Perspective, 26(2):85-103, 2017.
International Preliminary Report on Patentability for International Application No. PCT/US2021/041777 dated Jan. 26, 2023, 8 pages.
International Search Report and Written Opinion received in PCT/US2021/041777, mailed Oct. 27, 2021, 14 pages.
Yang et al., Privacy-Preserving Queries on Encrypted Data*, springer.com, 2006, retrieved on [Sep. 29, 2021]. Retrieved from the internet <URL:https://link.springer.com/contenUpdf/10.1007/11863908_29.pdf> entire document.

* cited by examiner

*Inputs:* $C$ inputs query $q \in \mathcal{D}$; $S$ inputs a database $Db = \{(d_1, l_1), \ldots, (d_N, l_N)\}$, where each $d_j \in \mathcal{D}$ and label $l_j \in \mathcal{LS}$.

402 — (1) [Preprocess] Both parties agree on function *Preprocess* : $\mathcal{D} \to \{0,1\}^{\mathcal{L}}$. Then, $C$ computes $B = Preprocess(q)$. For each $j \in [N]$, $S$ computes $B_j = Preprocess(d_j)$.

404 — (2) [Init] $S$ samples a key $k_s \xleftarrow{\$} \{0,1\}^{128}$ for AES and also $T$ subsampling functions $\{f_1, \ldots, f_T\}$, where for each $\ell \in [T]$, $f\ell : \{0,1\}^{\mathcal{L}} \to \{0,1\}^{\sigma}$ s.t. $\sigma + \log_2 T = 128$.

406 — (3) [Server's Local Subsampling] For each $j \in [N]$, $S$ generates subsample set $X_j = \{x_{j1}, \ldots, x_{jT}\}$ s.t. $x_{j\ell} = AES_{k_s}(f_\ell(B_j) \,||\, \ell)$ and $x_{j\ell} \in \mathcal{MS}$, where $\ell \in [T]$.

408 — (4) [Secret Sharing] For each $j \in [N]$, $S$ generates $\{ss_{j1}, \ldots, ss_{jT}\} \xleftarrow{\$} KS(0^\lambda \,||\, l_j)$ where $0^\lambda$ is an agreed token, $l_j$ is the label, and for each $\ell \in [T]$, $ss_{j\ell} \in \mathcal{LS}_s$.

410 — (5) [Client's 2PC Oblivious Subsampling] $C$ and $S$ run $(C_{AES}, S_{AES})$, where $C_{AES}$ takes input $B$, $S_{AES}$ takes inputs $k_S$ and $\{f_1, \ldots, f_T\}$. Then, $C_{AES}$ learns the subsample set $Y = [y_1, \ldots, y_T]$ s.t. $y_\ell = AES_{k_s}(f_\ell(B) \,||\, \ell)$ and $y_\ell \in \mathcal{MS}$ for each $\ell \in [T]$, and $S_{AES}$ learns $\bot$.

412 — (6) [STLPSI execution] $C$ and $S$ execute $(C_{STLPSI}, S_{STLPSI})$ on inputs $Y$ for $C_{STLPSI}$ and $DB = \{DB_1, \ldots, DB_N\}$ for $S_{STLPSI}$, where each $DB_j = \{(x_{j1}, ss_{j1}), \ldots, (x_{jT}, ss_{jT})\}$. At the end, $S$ learns $\bot$, and $C$ learns the list $R$ as per Definition 5.2. I.e., for each $(Y, DB_j)$ we have $r'_j = \{(x_{j\ell}, ss_{j\ell}) \in DB_j : x_{j\ell} \in Y\}_{\ell \in [T]}$, and $r_j = r'_j$ if $|r'_j| \geq t$, otherwise $r_j = \emptyset$. Then, $R = \{r_1, \ldots, r_N\}$.

414 — (7) [ExtractLabel] For each $r_j \in R$, $r_j \neq \emptyset$, $C$ recovers $0^\lambda \,||\, l_j$, where $0^\lambda$ is the validation token and $l_j$ is the matching label.

*Output:* $C$ outputs $(q, l_j)$ pairs recovered in Step 7. $S$ outputs $\bot$.

*FIG. 4A*

Inputs: $C$ inputs set $\mathcal{Y} = \{y_1, \ldots, y_T\} \subset \mathcal{MS}$; $S$ inputs $\mathcal{X} = \{\mathcal{X}_1, \ldots, \mathcal{X}_N\}$, where $\mathcal{X}_i = \{x_{i1}, \ldots, x_{iT}\} \subset \mathcal{MS}$, and $SS = \{SS_1, \ldots, SS_N\}$, where $SS_i = \{ss_{i1}, \ldots, ss_{iT}\} \subset SS$ is the secret shares of $0^\lambda \| l_i$ s.t. $\lambda$ is a param., $l_i \in \mathcal{LS}$.

1. [FHE parameters] Parties agree on FHE parameters ($m, m_p, m_{ct}, \vartheta$) for an IND-CPA secure FHE scheme, and on threshold ($t$), split ($B = \frac{NT}{ma}$) and windowing ($w \in \{2^1, 2^2, \ldots, 2^{\log B}\}$) parameters. Then, $C$ generates (public, secret) FHE keys ($pk, sk$), then sends $pk$ to $S$.

2. [Pre-process $\mathcal{X}$ and $SS$] $S$ bucketizes $\mathcal{X}$ into a table and splits each bucket (column) into $a$ partitions, then interpolates a $B$-degree polynomial $P_k$ for each partition, s.t. $P_k(x_{ij}) = ss_{ij}$, where $ss_{ij}$ is the secret share associated with $x_{ij}$. Then, $S$ batches coefficients at corresponding row (of lenght $m$) of the table into a plaintext polynomial $p_k^\ell$, where $\ell \in B, k \in a$.

3. [Compute encrypted query from $\mathcal{Y}$] $C$ concatenates its input set $\frac{m}{T}$ times and batches into a plaintext polynomial. Then, it homomorphically encrypts (by using $pk$) each windowing power ($w$) of this plaintext polynomial into the ciphertexts $[\![y_w]\!]$, then sends them to $S$.

4. [Homomorphic intersection] $S$, under encryption, i) expands The received $[\![y_w]\!]$ to $\{[\![y_0]\!], [\![y_1]\!], \ldots, [\![y_B]\!]\}$; ii) evaluates $[\![z_k]\!] = \sum_{\ell=0}^{B} [\![y_\ell]\!] \cdot p_k^\ell$ for each $k \in a$, and sends all ciphertexts $[\![z_k]\!]$ to $C$ after applying noise flooding and modulus switching on them.

5. [Decrypt and get result] $C$ decrypts (by using $sk$) ciphertexts $[\![z_k]\!]$ to obtain result vector $z_k$ (of length $m$) for each partition $k \in a$. Now, each item of $z_k$ will be the evaluation of $P_k(y_j) = ss_{ij}$ iff there is any $x_{ij} = y_j$ in partition $k$ of corresponding bucket, otherwise the item will be a random element in $\mathbb{F}_p$.

6. [Reconstruct label] $C$ runs KR algorithm on each $\binom{T}{t}$ combination of consecutive $T$ items of $z_k$, and gets a reconstruction result $s_i$. We have $r_i' = \{(x_{ij}, ss_{ij}) : x_{ij} = y_j \in \mathcal{Y}, ss_{ij} \in SS\}_{j \in [T]}$. Then $s_i = 0^\lambda \| l_i$ and $r_i = (r_i', l_i)$ iff $|r_i'| \geq t$, otherwise $s_i$ is a random element from $\mathbb{F}_p$ (see Def. 5.1) and $r_i = \emptyset$. $0^\lambda$ validates a label $l_i$ in DB.

Output: $C$ outputs a result set $R = \{r_1, \ldots, r_N\}$, where each $r_i \neq \emptyset$ is recovered in Step 6. $S$ outputs $\perp$.

*FIG. 4B*

(6) [Batch-STLPSI execution] $C$ and $S$ execute $(C_{\text{Batch-STLPSI}}, S_{\text{Batch-STLPSI}})$ on inputs $(Y_1, \ldots, Y_n)$ for $C_{\text{Batch-STLPSI}}$ and $DB = (DB_1, \ldots, DB_N)$ for $S_{\text{Batch-STLPSI}}$, where each $DB_j = ((x_{j1}, ss_{j1}), \ldots, (x_{jT}, ss_{jT}))$. At the end, $S$ learns $\perp$, and $C$ learns a list $R$ as per Definition B.1. I.e., for each $i \in [n], j \in [N]$, we have that $r'_{ij} = \{(x_{j\ell}, ss_{j\ell}) \in DB_j : x_{j\ell} \in Y_i\}_{\ell \in [T]}$, and $r_{ij} = r'_{ij}$ if $|r'_{ij}| \geq t$, otherwise $r_{ij} = \emptyset$. Then, $R = (r_{11}, \ldots, r_{nN})$.

*FIG. 4C*

PRIVACY-PRESERVING FUZZY QUERY SYSTEM AND METHOD

RELATED APPLICATION

This application is a U.S. National Stage application filed under 35 U.S.C. § 371 of PCT/US2021/041777 filed Jul. 15, 2021, which claims priority to, and the benefit of, U.S. Provisional Application No. 63/052,201, filed Jul. 15, 2020, entitled, "CONDUCTING PRIVACY-PRESERVING SEARCH OVER FUZZY DATABASES," each of which is incorporated herein by reference in their entirety.

BACKGROUND

The growth of biometrics use (e.g., in surveillance) poses a persistent challenge to keep biometric data private without sacrificing the apps' functionality. Recent advances in deep learning (DL)-based biometric identification have made possible real-time identification of persons in footage collected by surveillance equipment. The trend toward real-time surveillance in public and private places (e.g., streets, city halls, airports, retail stores, pharmacies, gas stations, etc.) has immense benefits for public safety or customer convenience. However, the adoption of these technologies can come at a significant privacy cost.

In existing biometrics surveillance systems, vendor stores and processes collected biometric data on servers in plaintext that can be readily searched. Individuals can opt-out of these systems since video footage (or any captured faces) are directly uploaded to a remote server. Even though tracking persons of interest may be desired or warranted, the concurrent tracking of everybody else while doing so can be unacceptable in many scenarios.

While the problem of private fuzzy search in a private matching protocol was introduced in Freedman et al. [29], practical implementation is still elusive. Other works [11, 18, 76] disclose threshold t-out-of-T matching outlined in [29]. These constructions require communication and computation resources that can increase in at least a linear manner with the size of the database, thus limiting the size of a search that may be performed.

SUMMARY

An exemplary system and method are disclosed that provide the private querying of a biometric scan, such as a person's photo, against a private database such that the client issuing the private query learns only the identity (and/or other associated information in the database) of the query if it is in the database while the server performing the processing learns nothing of the biometric scan. The exemplary system and method conduct privacy-preserving searches over fuzzy databases via a fuzzy labeled set intersection (FLPSI) protocol. FLPSI protocol computes an intersection of noisy input sets to assess for closeness/similarity metrics in an efficient and optimized search.

In one example of the exemplary private querying search (e.g., FLPSI), a client receives as input a query for biometric data to be searched against a database of biometric data maintained by a server. The server also maintains a label identifier for its biometric data. The query can be facial scan or images, fingerprint scan or images, retinal scan or images, voice data, handwriting data, DNA sequence data, or other biometric data.

The client and server each process their respective biometric data to generate binary encoded biometric bit vectors using a binary encoding model (e.g., Deep Learning model). The client and the server each processes their respective set(s) of binary encoded biometric bit vectors to generate a plurality of altered binary encoded biometric bit vectors (e.g., referred to as a plurality of masked bit vectors), e.g., by applying subsampling masks to the binary encoded biometric bit vectors.

The client and server then interactively conduct the search under encryption in a multiple-party computation (MPC) setting. The client sends its subsamples to the server under encryption. Then, the server conducts an encrypted search over its (second) masked bit vectors, which are generated from a database of biometrics data, wherein if there is a similar person with the query, their subsamples have t-out-of-T match. Server sends the encrypted search results to the client and the client checks if there is a t-out-of-T match between query and any of the database items.

At the end of the private query search, the client learns only an identifier label corresponding to database members that are close according to some pre-specified notion to the query without learning anything about the content of the database, while server learns nothing from the query.

Batch private queries may be performed for multiple private queries at the same time without employing more resources to each additional private query.

The exemplary system and method can provide low false matches and non-matches. The exemplary system and method can provide a clean and composable security guarantee in a multiple-party computation (MPC) protocol that is simulation-based while providing a precise specification of ideal-world behavior. Specifically, the biometric authentication definitions are game-based, which allows it to be bound, rather than precisely specify adversary success. This definitional approach can serve as a template in defining primitives in the biometric space. The definition of the exemplary private querying system is generic and incorporates possible leakage, often needed to facilitate an efficient sublinear protocol.

In an aspect, a method is disclosed to conduct a privacy-preserving search that reveals a matched label to a client while maintaining the confidentiality of a searched query in a database (e.g., wherein the privacy-preserving search maintains i) confidentiality of a searched query of a first user to a database of a second user and/or ii) confidentiality of the search results to the second user). The method includes receiving a first biometric data (e.g., facial scan or images, fingerprint scan or images, retinal scan or images, voice data, handwriting data, or DNA sequence data) in a privacy-preserving query client to be queried in the privacy-preserving search. The method includes generating a binary encoded biometric bit vector (also referred to as a "bio bit vector") from the first biometric data using a binary encoding model (e.g., deep learning model), wherein the binary encoded biometric bit vector comprises a set of bits of pre-defined length. The method includes generating a plurality of altered binary encoded biometric bit vectors by varying one or more bits of the binary encoded biometric bit vector via a local-sensitivity hash operation (e.g., a random projection subsample masking operation). The method includes converting the plurality of altered binary encoded biometric bit vectors into a plurality of first Hamming encoded data. The method includes transmitting a portion or all of the plurality of first Hamming encoded data associated with the first biometric data to a privacy-preserving query server operatively coupled to the database of a plurality of second biometric data, wherein each of the plurality of second biometric data has at least one corresponding identifier label, and wherein each of the plurality of second biometric data of the database had been converted a second Hamming encoded data using a second binary encoding model (e.g., wherein the first binary encoding model and the second binary encoding model are the same). The privacy-preserving query server assesses a closeness metric between the transmitted plurality of first Hamming encoded data, or a first set of masked data generated therefrom, and second Hamming encoded data of each, or a portion, of the plurality of second biometric data of the database, or a second set of masked data generated therefrom. The closeness metric is used to determine an identifier label for a matching first and second Hamming encoded data, or the first and second set of masked data generated therefrom.

In some embodiments, the plurality of Hamming encoded data, or a set of masked data generated therefrom, associated with the first biometric data are encrypted prior to being transmitted to the privacy-preserving query server.

In some embodiments, the closeness metric is based on a fuzzy matching operation (e.g., that defines a match as having t elements out of T elements matching).

In some embodiments, each identifier label on the database is converted into t-out-of-T secret shares, wherein the t-out-of-T secret shares are associated with the second set of masked Hamming encoded data, wherein the identifier is only matched if at least t secret shares of the t-out-of-T secret shares are obtained.

In some embodiments, converting the plurality of altered binary encoded bit vectors to a plurality of first Hamming encoded data employs a Super-Bit Locality Sensitive Hash (SBLSH) operation.

In some embodiments, the second Hamming encoded data, or a set of masked data generated therefrom, of each of the plurality of second biometric data are encrypted as masked data.

In some embodiments, the binary-encoded biometric bit vector is generated from the first biometric data using at least one of a deep learning model, a locality sensitivity hashing algorithm, or a binary learning model (e.g., that employs discrete locally linear embedding).

In some embodiments, the first biometric data comprises image data.

In some embodiments, the first binary encoding model and the second binary encoding model are the same.

In some embodiments, the generating the plurality of altered binary encoded bit vectors by the client and the privacy-preserving query server, respectively, employs a set of first random projection masks and a set of second random projection masks, wherein the sets of first random projection masks and second random projection masks are the same.

In some embodiments, the first biometric data comprises at least one of facial scan or images, fingerprint scan or images, retinal scan or images, voice data, handwriting data, or DNA sequence data.

In some embodiments, the privacy-preserving search is used for surveillance or for identification in an investigation.

In some embodiments, the plurality of first Hamming encoded data, or the first set masked data generated therefrom, are evaluated in a batch operation with other Hamming encoded data or a set of masked data generated therefrom.

In another aspect, a method is disclosed of operating a privacy-preserving query server to conduct a privacy-preserving search that reveals a matched label to a client while maintaining the confidentiality of a searched query in a database (e.g., wherein the privacy-preserving search maintains i) confidentiality of a searched query of a first user to a database of a second user and/or ii) confidentiality of the search results to the second user). The method includes retrieving a plurality of biometric data (e.g., facial scan or images, fingerprint scan or images, retinal scan or images, voice data, handwriting data, or DNA sequence data) for a plurality of individuals, including a first biometric data for a first individual and a second biometric data for a second individual. The method includes, for each of the plurality of biometric data, generating a binary encoded biometric bit vector using a first binary encoding model (e.g., deep learning model), including a first binary encoded biometric bit vector for the first biometric data and second binary encoded biometric bit vector for the second biometric data, wherein the first binary encoded biometric bit vector and the second binary encoded biometric bit vector each includes a set of bits of pre-defined length (e.g., wherein one or more bits of the set of bits of are either the first biometric bit vector or the second biometric bit vector are associated with a deep-learning feature computed from the respective first biometric data and second biometric bit vector). The method includes, for each respective binary encoded bit vector associated with the first biometric data and second biometric bit vector, generating a plurality of altered binary encoded biometric bit vectors for the respective binary encoded biometric bit vector by varying one or more bits of the respective biometric bit vector via a local-sensitivity hash operation (e.g., a random projection local-sensitivity sub-sample masking operation), wherein a plurality of first altered binary encoded biometric bit vectors is generated from the first binary encoded biometric bit vector, and wherein a plurality of second altered binary encoded biometric bit vectors is generated from the second binary encoded biometric bit vector. The method includes converting the plurality of first altered binary encoded biometric bit vectors and the plurality of second altered binary encoded biometric bit vectors to a plurality of first Hamming encoded data and a plurality of second Hamming encoded data, respectively. The method includes storing the plurality of first Hamming encoded data and the plurality of second Hamming encoded data in a database in which the privacy-preserving query server assesses a closeness metric between i) the plurality of first Hamming encoded data and the plurality of second Hamming encoded data, or the first and second set of masked data generated therefrom and ii) a plurality of third Hamming encoded data, or a third set masked data generated therefrom, received from a privacy-preserving query client, wherein the closeness metric is used to determine an identifier label that is returned to the privacy-preserving query client.

In some embodiments, the plurality of first Hamming encoded data, the plurality of second Hamming encoded data, and the plurality of third Hamming encoded data are encrypted as the first, second, and third set of masked data, respectively.

In some embodiments, the closeness metric is based on a fuzzy matching operation (e.g., that defines a match as having t elements out of T elements matching).

In some embodiments, the first binary encoded biometric bit vector is generated using a convolutional neural network or a binary code learning (e.g., that employs discrete locally linear embedding).

In some embodiments, the first biometric data and the second biometric data comprise image data.

In some embodiments, the first biometric data and the second biometric data each comprises at least one of facial scan or images, fingerprint scan or images, retinal scan or images, voice data, handwriting data, or DNA sequence data.

In some embodiments, the plurality of third Hamming encoded data, or the third set masked data generated therefrom, are evaluated in a batch operation with other Hamming encoded data or a set of masked data generated therefrom.

In another aspect, a system is disclosed comprising a processor and a memory operatively coupled to the processor and having instructions stored thereon, wherein execution of the instructions by the processor causes the processor to perform any of the above-discussed methods.

In another aspect, a non-transitory computer-readable medium is disclosed having instructions stored thereon, wherein execution of the instructions by a processor causes the processor to perform any of the above-discussed methods.

BRIEF DESCRIPTION OF THE DRAWINGS

The accompanying drawings, which are incorporated in and constitute a part of this specification, illustrate embodiments and, together with the description, serve to explain the principles of the methods and systems.

FIG. 4A shows an example algorithm of the FPLSI protocol in accordance with an illustrative embodiment.

FIG. 4B shows an algorithm for the Set Threshold LPSI (STLPSI) protocol employed in the algorithm of FIG. 4A in accordance with an illustrative embodiment.

FIG. 4C shows an algorithm for the FPLSI algorithm of FIG. 4A for batch operation in accordance with an illustrative embodiment.

DETAILED SPECIFICATION

Some references, which may include various patents, patent applications, and publications, are cited in a reference list and discussed in the disclosure provided herein. The citation and/or discussion of such references is provided merely to clarify the description of the disclosed technology and is not an admission that any such reference is "prior art" to any aspects of the disclosed technology described herein. In terms of notation, "[n]" corresponds to the nth reference in the reference list. For example, Ref. [1] refers to the $1^{st}$ reference in the list. All references cited and discussed in this specification are incorporated herein by reference in their entireties and to the same extent as if each reference was individually incorporated by reference.

Privacy-Preserving Fuzzy Query System

Figure 1:
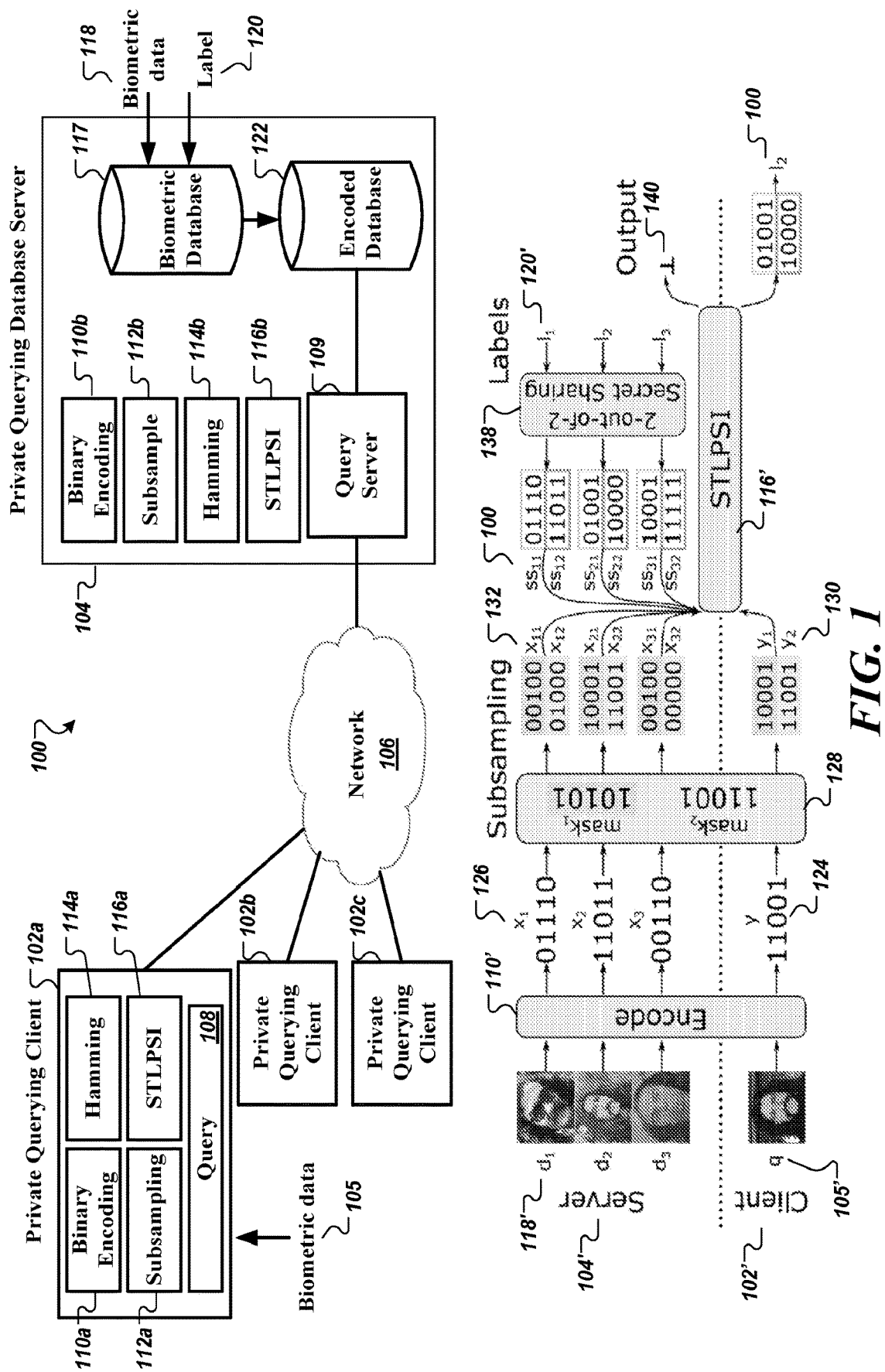
FIG. 1 shows a privacy-preserving fuzzy query system 100 comprising a private querying client that operates with a private querying server to execute the fuzzy labeled private search intersection (FLPSI) protocol in accordance with an illustrative embodiment.

FIG. 1 shows a privacy-preserving fuzzy query system 100 comprising a private querying client 102 (shown as 102a, 102b, 102c) that operates with a private querying server 104 over a network 106 to execute the fuzzy labeled private search intersection (FLPSI) protocol. A functional diagram also shows the privacy-preserving fuzzy query system 100 comprising the private querying client 102 (shown as 102') and the private query server 104 (shown as 104').

The privacy-preserving fuzzy query system 100 employs a fuzzy labeled set intersection protocol configured to conduct biometric privacy-preserving searches of a biometric data 105, e.g., a biometric image or biometric scan from an image file or a video stream, over fuzzy database(s). Example of biometric data includes, but are not limited to, facial scan or images, fingerprint scan or images, retinal scan or images, voice data, handwriting data, DNA sequence data, or other biometric data or scan.

In the example of FIG. 1, Private querying client 102 includes a query module 108 that operates with a binary encoding module 110a, a subsampling module 112a, a Hamming module 114a, and a Set Threshold LPSI (STLPSI) module 116a. The private querying client 102 (also referred to herein as Client C) can be a desktop, server, smartphone, or other computing device configured with the FPLS client application.

The private query server 104 (also referred to herein as Server S) is configured to receive a query request 224 (see FIG. 2) from any one of the private querying clients (e.g., 102a, 102b, 102c). The private query server 104 maintains a biometric database 117 comprising a set of biometric data 118 and corresponding label 120. The Private query server 104 includes the same or compatible binary encoding module (shown as 110b), subsampling module (shown as 112b), Hamming module (shown as 114b), and a corresponding STLPSI module (shown as 116b).

Private query server 104 converts the library of biometric data 118 into a Hamming-efficient encoded data (not shown) and stores them in an encoded database 122. The conversion may be similar or compatible to the pre-processing and subsampling operation (shown as 110b, 112b, 114b, respectively) as that of the private querying client 102 such that the two data sets are in the same Hamming searching space.

The private query server 104 receives a homomorphically encrypted subsampled query comprising the Hamming-efficient encoded data from the client 102. The server 104 can compute an ciphertext using the encrypted subsampled query, a secret share, and its encrypted subsamples from the library. The server 104 sends the ciphertext to the client 102 to compute the intersection of noisy input sets by considering closeness/similarity. Upon a t-out-of T determination, the computation provides a label for the queried biometric data 105. To this end, the queried biometric data 105 resides entirely at the private query client 102 as confidential/private and is not shared with the private querying server 104. In addition, the private querying server 104 shares only the Hamming-efficient encoded data of its library of biometric data 117 with the private query client 102, so the biometric data 118 is maintained strictly confidential/private.

The exemplary FLPSI protocol can efficiently compute the intersection among the query data and library data as noisy input sets by considering the closeness and similarity (e.g., Hamming distances) of the encoded data rather than equality. This operation can be readily and practically performed using modest or reasonable computing resources available at the private query client 102.

In addition, the exemplary FLPSI protocol can achieve sublinear communication cost as the database size grows, which makes it very practical to implement in real-world databases having hundreds of thousands to millions of unique data. The FLPSI computation in a query of over 10 million biometric data involves the transmission of about 40 MB of data from the private query server 104 to the private query client 102. The FLPSI protocol may be built using standard cryptographic primitives such as AES blockcipher, garbled circuits, Shamir's secret sharing, and/or lattice-based fully homomorphic encryption schemes.

As noted above, the private query system 102 performs the pre-processing and subsampling (via modules 110a, 112a, 114a, respectively) to prepare biometric data (e.g., 105) in a query request for a biometric privacy-preserving search. The private query server 104 performs the same or compatible pre-processing, subsampling, and Hamming operation (via modules 110b, 112b, and 114b) to prepare a library of encoded biometric data (e.g., in database 122).

Query module (e.g., 108) of client 102 is configured to receive biometric data (shown as "q" 105). Query module 108 directs the binary encoding module 110a (shown as "Encode" 110') to generate a binary encoded biometric bit vector 124 (shown as "y" 124) of the biometric data 105.

Query module 108 generates a query request (not shown) and transmits it to query module 109 of server 104. Query module 109 handles the request to execute the FLPSI protocol portion of server 104. Though shown in FIG. 1 as separate modules, Query module 109 may be integrated into the STLPSI protocol in some embodiments.

Query module 108 provides an interface (e.g., graphic user interface) to receive the image file or video stream. In some embodiments, Query module 118 can extract images from a video stream or is configured to operate with remote software (not shown) that provides the processed image file or image data. In some embodiments, Query module 108 provides an interface (e.g., API interface) to a surveillance system (not shown).

Binary encoding module (e.g., 110a, 110b) of either the private query client 102 and private query server 104 can be implemented in a deep learning algorithm that is employed to turn raw or pre-processed biometric readings (e.g., 105) into embedding vectors with the guarantee that two such vectors will only be close in Euclidean distance if and only if they are from the same person. An example deep learning algorithm is FaceNet, as described in [35], which provides a guarantee that two such vectors will only be close in Euclidean distance (or cosine similarity) iff they are of the same person. In some embodiments, signature or pattern recognition operations may be used.

In the example of FIG. 1, the private querying client 102 (shown as 102') encodes the biometric data "q" 105 (shown as 105') to generate a binary encoded biometric bit vector "y" 124 having a pre-defined length of 5 bits, shown as "11001." Each bit of the binary encoded biometric bit vector corresponds to a Hamming encoded feature that can uniquely distinguish the binary encoded biometric bit vector of one biometric data from another. The private querying server 104 (shown a 104') encodes via binary encoding module 110' a library of biometric data 118 (shown as "$d_1$", "$d_2$", "$d_3$" 118') to generate a set of binary encoded biometric bit vector "x") 126 (shown as "$x_1$", "$x_2$", "$x_3$" 126). The binary encoded biometric bit vector "$x_1$", "$x_2$", "$x_3$" 126 also has the same length as binary encoded biometric bit vector "y" 124, shown having values "01110", "11011", and "00110." Each bit of the binary encoded biometric bit vector "x" also corresponds to a Hamming encoded feature that can uniquely distinguish the binary encoded biometric bit vector of one biometric data from another.

Subsampling module (e.g., 112a, 112b) of either the private query client 102 and private query server 104 is configured to apply a set of random projections to a binary encoded biometric bit vector (also referred to as a "bio-bit vector") to generate a list of subsample or altered vectors (also referred to herein as altered binary encoded biometric bit vectors). The altered binary encoded biometric bit vectors, and binary encoded biometric bit vector have the property that if two data (e.g., biometric data) are of the same identifier or label (e.g., associated with the same individual), then some subset of the subsample vectors would be the same. In some embodiments, Subsampling module 112a is configured to generate T random subsamples "$y_T$" for the binary encoded biometric bit vector "y" 124.

In the example of FIG. 1, the private querying client 102' applies a set of masks 128 (shown as "$mask_1$" and $mask_2$" having binary values "10101" and "11001", respectively) to the binary encoded biometric bit vector "y" 124 (shown having the binary value "11001") to generate the altered binary encoded biometric bit vectors $y_i$ 130 (shown as "$y_1$" and "$y_2$" 130). In this example, altered binary encoded biometric bit vectors $y_i$ is generated via an operator being performed on y (124) and mask$_i$ (128). The private querying server 104' applies the same set of masks 128 to its set of binary encoded biometric bit vector $x_i$ 126 (shown having binary values "01110", "11011", and "00110") to generate the altered binary encoded biometric bit vectors $x_{ij}$ 132 (shown as "$x_{11}$", "$x_{12}$", "$x_{21}$", "$x_{22}$", "$x_{31}$", "$x_{32}$" 132). In this example, the set of altered binary encoded biometric bit vectors $x_{ij}$ 132 is generated via an operator being performed on $x_i$ (126) and mask$_i$ (128) described later herein.

In some embodiments, Yao's Garbled Circuits (GC)-based 2PC protocol as described in [47] may be used to extract the client's subsample set.

Hamming module (e.g., 114a, 114b) of either the private query client 102 and private query server 104 is configured to convert the subsample vectors (i.e., altered binary encoded biometric bit vectors) into a plurality of Hamming encoded data. In some embodiments, a Super-Bit Locality Sensitive Hash (SBLSH) is used, e.g., as described in [24], along with a noise reduction (NR) operation to convert the embedding vectors into binary encoded biometric bit vectors with the property that if they are Hamming-close, then they originated from the biometric data of the same individual.

Other common dimension reduction processes may be used in scalable image search applications, as described in [26, 49]. Hamming module 114 may apply the encoding in module 110'.

While the pre-processing and subsampling operation transforms biometric data into Hamming encoded space, the exemplary STLPSI module operation 116' (via modules 116a and 116b) performs an efficient t-out-of-T matching protocol that beneficially has a sublinear communication cost as the size of the searched database increases.

STPLSI module (e.g., 116a, 116b). Though previous steps prepare the inputs to accommodate a t-out-of-T matching scheme, modules 116a, 116b employs a set threshold LPSI protocol as described in [9] to achieve a sublinear communication cost relative to a growing database of biometric data.

For the Set Threshold LPSI (STLPSI) operation (412) (previously referenced as 116a), private query client 102 is configured to perform a t-out-of-T matching operation in a Set Threshold LPSI (STLPSI) operation (e.g., 116'—see FIG. 1) between the altered binary encoded biometric bit vectors $y_i$ 130 and the set of altered binary encoded biometric bit vectors $x_{ij}$ (e.g., 132—see FIG. 1). Rather than operating on the altered binary encoded biometric bit vectors $x_{ij}$ (e.g., 132) directly, the STLPSI operation 134 operates on secret-sharing outputs $ss_{ij}$ (e.g., 136—see FIG. 1) generated from the set of altered binary encoded biometric bit vectors $x_{ij}$ by a t-out-of-T secret sharing module 138 (shown in this example as "2-out-of-2 secret sharing"). That is, for label 120 (shown ash 120') to be the resulting output 140 (shown as "⊥" 140 of the STLPSI computation.

Example Method of Operation of the Fuzzy Labeled Private Set Intersection (FPLSI Protocol)

Figure 2:
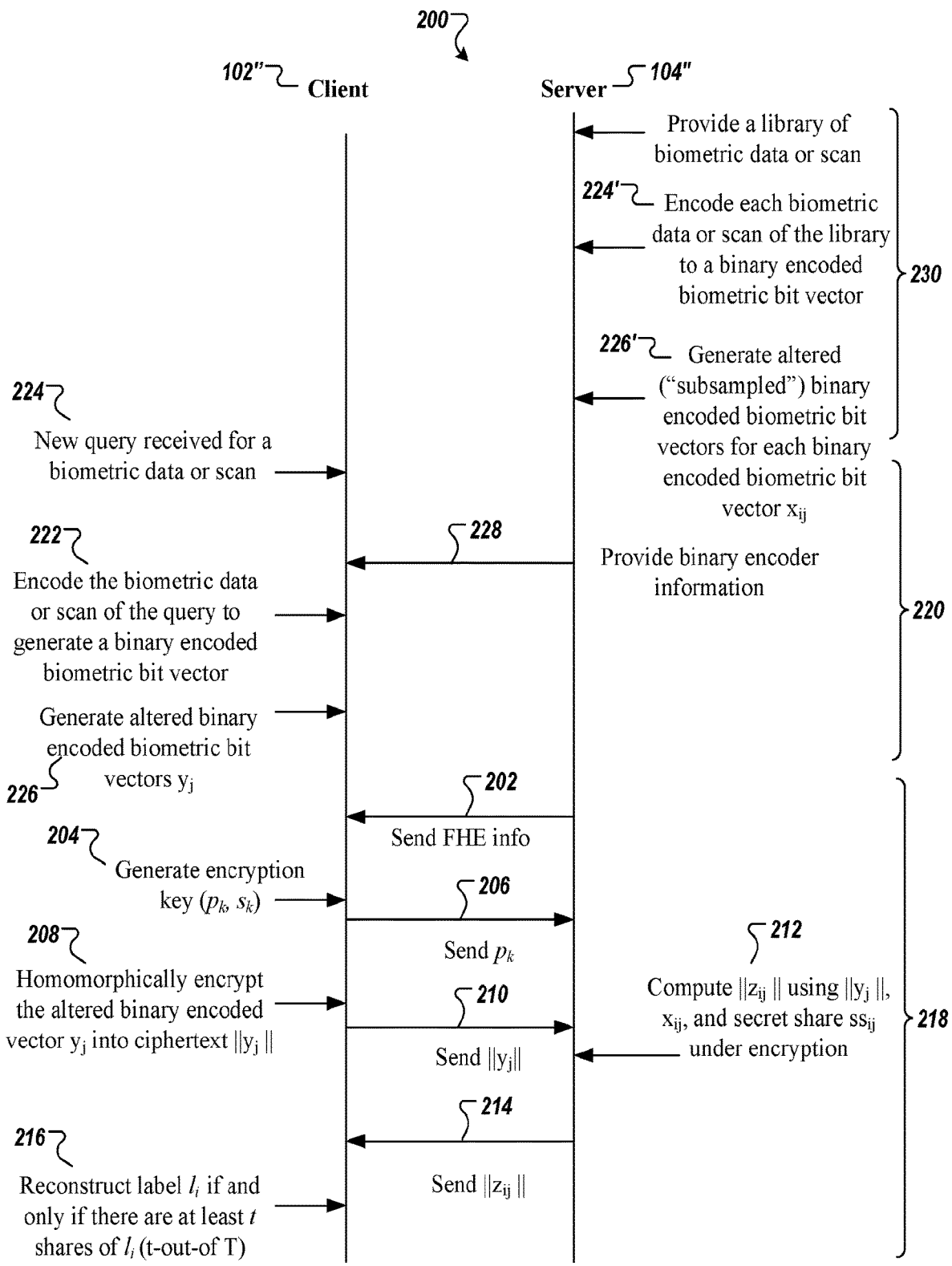
FIG. 2 shows a flow diagram of an example implementation of the FLPSI protocol in accordance with an illustrative embodiment.

FIG. 2 shows an example method 200 to execute the FLPSI protocol in accordance with an illustrative embodiment.

Client C 102" can learn that enough subsamples are matched as well as learn the actual number of matched subsamples (i.e., the degree of closeness of the matched biometric data). If there is insufficient subsample matching, client C 102" learns nothing. From an information theory perspective, this is the only information leakage that the STLPSI protocol incurs. The degree of information leakage when there is a non-match is strictly less than what the client C 102" learned when there is a matched biometric data from the database. In either scenario, the server S 104" learns nothing about the query besides that one was initiated so long as the client C 102" allows server S 104" to send the entirety of its encoded data rather than being requested to stop transmission upon a matched being found.

In the example shown in FIG. 2, the FLPSI protocol is executed between i) a client C 102 (shown as 102") that holds a set of items (e.g., biometric data of an individual) and ii) a server S 104 (shown as 104") that holds a set of sets of items (e.g., sets of biometric data for a set of individuals) and corresponding labels for each item, where each set includes T items. In the STLPSI protocol, Client C 102" learns the labels corresponding to a matched item, iff more than a threshold number t items match from each set, and the server S 104" learns nothing about the query. The term "iff" as used herein refers to "if and only if" and is used interchangeably with that meaning.

Server S 104" can secret-share labels $l_i$ (e.g., 120 or 120') to the client C 102" that the client C 102" can use to reconstruct the label when t shares are matched. The client C 102" can thus learn the labels for the database items (e.g., biometric data) that had sufficiently defined numbers of matches with a given query. In other words, client C 102" can learn the identity of an individual matching a biometric data in its query and any data associated to the label. Because the client C 102" can learn subsamples that match for a given biometric data, and because the client C 102" knows the projection LSH functions, it can learn a lot of information about the bio-bit vectors and hence biometric data matched in the database of the server S 104".

Put another way, in some embodiments, only the server S 104" knows the projection LSH functions and an AES blockcipher key. The STLPSI as executed by the client C 102" and server S 104" can perform a secure two-party computation (2PC) protocol so that the client C 102" and server S 104" learn a one-way function of the encryption of the projections, as the output of the STFPSI, and doing so without the server C 102" knowing the projection functions and the encryption key. Moreover, to increase sensitivity, the one-way function also concatenates the respective function index to the projection before its encrypting to avoid cross subsample matchings, as further described herein.

Because the server S 104" has sole access to the projections and the key, it can also locally pre-compute the subsamples of each entry in its database. Hence, the communication cost of this step is independent of the database size.

Referring to FIG. 2, the STLPSI operation 218 is first shown. Client C 102" and server S 104" first agree on a fully homomorphic encryption (FHE) scheme. In FIG. 2, server S 104" sends (202) the FHE scheme to the client C 102". Client C 102" generates (204) (public, secret) keys $(p_k, s_k)$ and sends (206) $p_k$ to server S 104". Client C 102" also homomorphically encrypts (208) each set item $y_j \in \mathcal{Y}$ (where $y_j$ is the subsampled biometric bit vectors) into a ciphertext $\|y_j\|$ and sends (210) them to the server S 104".

Then, server S 104" computes (212) $\|z_{ij}\| = r \times (\|y_j\| - x_{ij}) + ss_{ij}$ under encryption, where $r \in_R \mathcal{P}$ and is refreshed for each computation, $x_{ij}$ is the subsampled bit vectors stored at the server, and $ss_{ij}$ is the secret share (of label $l_i$) associated with $x_{ij}$. Polynomial interpolation can be used as an alternative to generating $\|z_{ij}\|$ (212). With polynomial interpolation, Server S 104" can interpolate an N-degree polynomial $P_j$, by using ⟨item⟨, ⟩ secret share⟩ pairs $(x_{ij}, ss_{ij})$ such that $P_j(x_{ij}) = ss_{ij}$. Since $P_j(y) = \alpha N y^N + \ldots + a_1 y + a_0$, where the $a_i$ could be pre-computed by the server S (e.g., 104) in the offline phase, which can improve the scalability of the STLPSI, $P_j$ can be homomorphically evaluated in O(log N) multiplicative depth given $\|y\|$. Further, with polynomial interpolation, a single $\|z_{ij}\|$ can encode a secret share corresponding to any of the matching $x_{ij}u$.

Because each of T set items is generated through different LSH projections, each projection is interpreted as a bucket (with N items) without needing to formally perform bucketing. Bucketing is a PSI technique [50], also used in CHLR18. It improves asymptotic performance but can be costly, as buckets must be padded with dummy elements for security.

The bucketing-like operation may be combined with windowing operation. Interpolating polynomials over buckets may not scale to large N values (e.g., a database with over a million entries). If the client C sends the encryptions of $y^{2^0}, y^{2^1}, y^{2^2}, \ldots, y^{2^{\log N}}$, the server S can homomorphically compute all necessary powers of y in O(log log N) multiplicative depth. This technique can decrease C←S communication cost by a factor of N but increases the C→S cost by a factor of log N, which reduces the communication cost sine log N has a small impact on overall communication given that the client C only holds a set of T items.

To speed up homomorphic evaluations, the server S can split, in a splitting operation, each bucket into a partition such that it interpolates an N/a-degree polynomial per partition. This reduces the multiplicative depth to O(log log N/a), and the number of y powers (C sends to S) to log N/a but can increase the C←S communication by a factor of a because the server S sends results for all partitions to the client C.

Server S 104" sends (214) the ciphertext $\|z_{ij}\|$ to the client C 102" (also referred to herein as "C←S communication"). The secret shares are uniformly sampled items in $\mathcal{SS}$ (equal to $\mathcal{MS}$). To this end, $z_{ij} = s_{ij}$ iff $y_j = x_{ij}$. Otherwise, $z_{ij}$ is random on $\mathcal{SS}$. Now, it is guaranteed that the client C 102" can reconstruct (216) the label $l_i$ iff it gets at least t shares of $l_i$. Otherwise, client C 102" learns nothing and cannot distinguish possible below-threshold t matches.

Noise flooding. The server S can re-randomize the returned ciphertexts by adding fresh encryptions of zero with large noise [22']. This results in increased FHE parameters.

Modulus switching may be employed to reduce the complexity of a ciphertext at some degrees [9']. The server S can perform SEAL's modulus switching on encrypted results before sending them to client C. After receiving the evaluation results, the client C can decrypt each of them to m/T sets (each with T results). Then, the client can run the reconstruction algorithm KR on $$\binom{T}{t}$$

combinations of each set and obtains a label $1_i$ iff at least t query subsamples match with the ones from $i^{th}$ database set.

FIG. 4B shows the algorithm for an example implementation of the STLPSI protocol.

Referring to FIG. 2, to generate the altered binary encoded vector $y_j$, the client C 102", in a pre-process and subsample operation 220, can encode (222) the biometric data of a received query (224) to generate a binary encoded biometric bit vector and generate (226) the altered binary encoded biometric bit vectors $y_j$ from that binary encoded biometric bit vector, e.g., as discussed in relation to FIG. 1. In FIG. 2, the server S 104" can pre-process 230 its library of biometric data by performing similar encoding operations on each of its biometric data (shown as 224' and 226').

In addition, in some embodiment, in response to a new query 224, the client C 102" may request and is provided (228) information from the server S 104" for the binary encoding operation 222.

The operation may be performed in batches to facilitate Single Instruction Multiple Data (SIMD) on ciphertexts. Description of batching is provided in [8', 17', 30', 31', 60']. SIMD batching may be employed from FHE library SEAL [56']. To accommodate batching, the server S can group coefficients associated with the same powers of $y_1, y_2, \ldots y_T$ from different buckets into vectors of length m. Since m is parameterized as m>>T, S can also concatenate coefficients from m/T partitions. This results in the batching of m/T sets into a single vector that decreases each partition size to NT/m. Finally, the client C can concatenate its set m/T times and batches into a plaintext polynomial, then it computes all windowing power of it and sends encryptions of them to S. Overall, batching and batching-equivalent operations can decrease i) the FHE multiplicative depth to O(log log NT/ma), ii) the number of y powers (C sends to S) to log NT/ma, and iii) C←S communication by a factor of m/T. FIG. 6 shows Fuzzy Labeled Private Set Intersection (FPLSI) Protocol FIG. 4A shows an example Fuzzy Labeled Private Set Intersection (FPLSI) protocol and its construction in the closeness domain ($\mathcal{D}$, Cl) and label space $\mathcal{LS}$. The FPLSI protocol uses the building blocks the AES blockcipher, t-out-of-T secret sharing scheme (KS, KR), 2PC protocol ($C_{AES}$, $S_{AES}$), and STLPSI protocol ($C_{STLPSI}$, $S_{STLPSI}$) with the item space $\mathcal{MS}$ and label space $\mathcal{LS}_S$. The FPLSI can be readily extended to batch operation.

FIG. 4C shows an example FPLSI operation for batch images. Notably, batch operations can substantially improve the efficiency of a query as compared to performing the same search individually. It has been observed that batch operation can increase the speed of FPLSI by 9× for a query of 64 biometric data (instead of 1).

In FIG. 4A, "Preprocess" (402) includes instructions that generate $\mathcal{L}$-bit input vector for an input from $\mathcal{D}$; $k_S$ is a 128-bit AES blockcipher key, T is the number of subsamples, and λ is a security parameter; and for each l∈ [T], $f_l$ function takes $\mathcal{L}$-bit input and outputs σ-bit bit vector such that σ+$\log_2$ T=128 (e.g., to operate $AES_{kS}$ ($f_l(\bullet)$∥l)) for any $\mathcal{L}$-bit input of $f_l$).

The outputs of both $\mathcal{S}$'s subsampling in Step 3 (406) and ($C_{AES}$, $S_{AES}$) (Step 5) (410), and the input items of $C_{STLPSI}$ and $S_{STLPSI}$ should be in the same domain $\mathcal{MS}$. Moreover, the output of secret sharing KS (Step 4) (408) and the input labels of $S_{STLPSI}$ should be from the same domain $\mathcal{LS}_S$. Also, the output of $C_{STLPSI}$ and input of secret recovery KR (Step 7) (414) should be from the same domain $\mathcal{LS}_S$.

Figure 3:
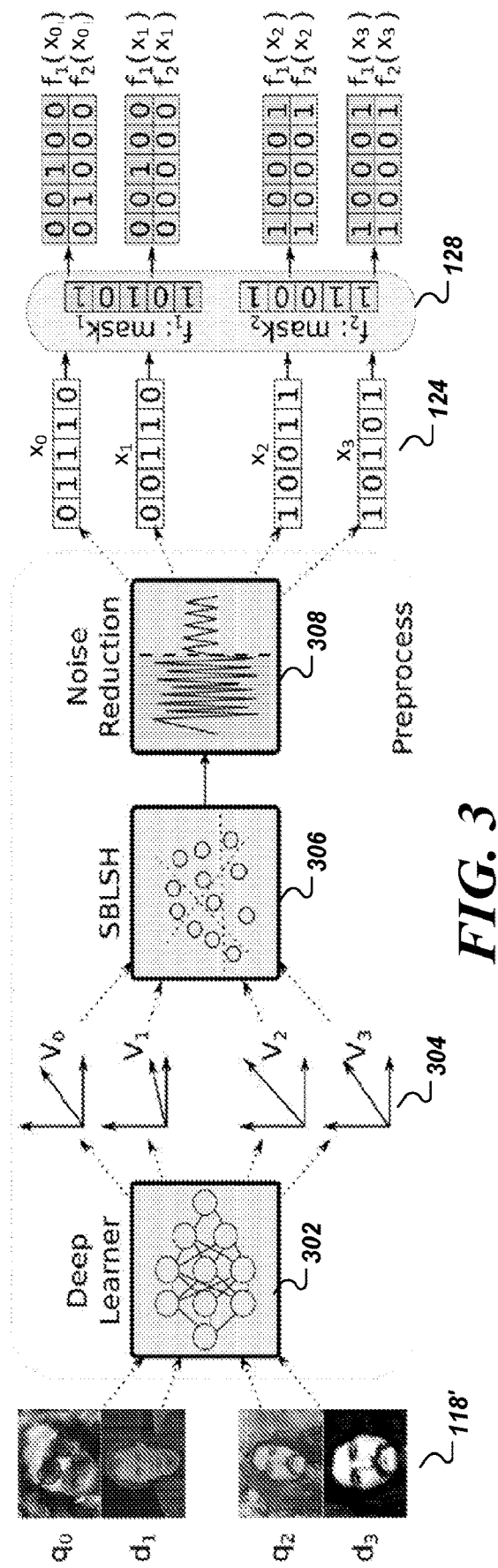
FIG. 3 sows an example processing and subsampling operation of the FPLSI protocol in accordance with an illustrative embodiment.

FIG. 3 shows an example processing (402) and subsampling (406) operation for the FPLSI protocol. In FIG. 3, the raw biometric data (e.g., 118') is first processed into feature vector representations (e.g., embedding vectors) by using a DL system (302) such as FaceNet [35], which provides a guarantee that two such vectors (304) will only be close in Euclidean distance (or cosine similarity) iff they are of the same person.

Though the Euclidean space of DL accurately captures the statistical properties of the raw input data, unfortunately, even the two consequent biometric scans of a person will not result in the same embeddings due to the continuous nature of the Euclidean space. Hence, in order to accommodate t-out-of-T matching, the exemplary FPLSI protocol translates the biometric data from the Euclidean space into Hamming SBLSH (306) is built on top of Sign-Random-Projection LSH (SRP-LSH) [5], which turns input vectors into one-bit hash such that if two input vectors are close in angular distance, it is likely that their SRP-LSH will be the same. In particular, SRP-LSH is defined as $h_v(x)=\text{sgn}(v^T x)$, where x, v are d-dimensional vectors (x is the input (e.g., embedding vector), and v is sampled with normal distribution), and sgn(•) is the sign function (i.e., "1" if the input is greater than or equal to 0, otherwise 0).

Referring to FIG. 3, noise reduction operation (308) may be employed, when applicable, to allow client C to extract multiple biometric samples from a video stream (e.g., a short surveillance video) in order to perform noise removal. Because people normally will not be able to give the same identical pose throughout a video recording, client C can treat each individual frame in a video as a different sample. In addition, the server S can also capture multiple samples per person. Both subsampling modules of the client C and server C can take bit vectors, generated in the SBLSH step through $\mathcal{N}_{br}$ biometric readings, and perform majority vote over each bit. If a certain amount of them agree (e.g., at least $\tau_{rb}$ percent), the bit vectors are kept. Otherwise, the bit vectors are canceled. After eliminating noisy bits through multiple samples, the NR layer gives the residual bit vector $B_i$(having $\mathcal{N}_{rb}$ reliable bits) of a person i to the subsampling layer.

For subsampling (408, previously referred to as 128 in FIG. 1), the client C or server S can apply a random projection LSH functions $\{f_1, \ldots, f_T\}$ to the bit vector $B_i$, generated in the preprocessing step. The random projection LSH functions are different from SBLSH. In particular, for each l∈ [T], $f_l$ extracts $\mathcal{N}_{sb}$ bits from $B_i$, by intersecting it with a mask of the same length but only contains $\mathcal{N}_{sb}$ ones, which essentially turns all other bits into a constant zero.

For instance, in FIG. 3, ($B_0$, $B_1$) and ($B_2$, $B_3$) are bit vector pairs of different people and the same person, respectively. ($B_0$, $B_1$) has 1-out-of-2 subsample matching, and ($B_2$, $B_3$) has 2-out-of-2 subsample matching. To improve the sensitivity, the same subsample values generated by different functions (e.g., $f_1(B_2)=f_2(B_3)$) can be further distinguished by concatenating the function's index l∈ [T] at the end of the $l^{th}$ subsample (e.g., $f_1(B_2)\|1 \neq f_2(B_3)\|2$).

The STLPSI operation may be built using a fully homomorphic encryption (FHE) library SEAL v3.2 [36], by using Brakerski/Fan-Vercauteren scheme [15]. To improve the scalability of the STLPSI module 116, in certain implementations, the AES blockcipher as used in the 2PC one-way functions can be executed in a reduced number of AND gates. The STLPSI operation may employ a t-out-of-T Shamir's secret sharing scheme described in [37] to generate shares for each label in the database of the server 104.

The STLPSI operation can be implemented, e.g., based on CHLR18, with a reduced number of homomorphic evaluations on the server S (e.g., 104). It has been observed that certain implementations that reduce the number of returned results to client C (e.g., 102) by almost half in terms of communication and computation costs. In addition, similar to many PSI protocols [18], the STLPSI protocol can be implemented using bucketing (e.g., via cuckoo hash tables) to efficiently compute intersections. In addition, the database on server 112 can be configured with a balanced load of bins of its hash tables.

In addition, the optimization from the (L)PSI literature for compressing database DB items and reducing the circuit depth in FHE evaluations may be implemented as described in [9', 16', 17', 28', 29', 48', 49', 60']. With the exception of bucketing, CHLR18 [16] can be closely following in applying the optimization for polynomial interpolation, among others.

In CHLR18, client C and server S can agree on three hash functions $\{h_1, h_2, h_3\}$, where each output is from 0 to m−1. The client C stores its set Y in a cuckoo hash table by using $\{h_1, h_2, h_3\}$ and a vector $B_C$, where $|B_C|=m$ bins. For example, client C can places each $y_j \in Y$ into $B_C[h_i(y_j)]$ bin for a randomly chosen $\{h_1, h_2, h_3\}$ such that all $B_C$ bins only include one item in $\mathcal{MS}$: $y_j \in Y$ or a dummy value. Server S also stores its set X in a vector $B_S$, with m bins, by using $\{h_1, h_2, h_3\}$. However, Server S places each $x_j \in X$ items in $B_S[h_i(x_j)]$ bin for each of $\{h_1, h_2, h_3\}$ such that each bin will contain B items in $\mathcal{MS}$, where B is the largest bin size. Hence, other bins are padded with dummy values from $\mathcal{MS}$. Server S also associates a label $l'_j \in \mathcal{LS}_S$ for each $x_j \in X$. Then, for each $k \in [0,m)$, Server S finds a polynomial H(x) interpolating all (item, label) pairs $(x_j, l'_j) \in B_S[k]$ s.t. $H(x_j) = l'_j$.

At this point, the intersection of X∩Y is equal to the union of all bin-wise intersections between $B_C$ and $B_S$. CHLR18 specifies the following method for computing the label of a queried item. Server S picks a random element $r \in \mathbb{F}_p$ and locally computes:

$$F(y) = r \prod_{j=1}^{D} (y - x_j)$$ (Equations 1 and 2)

$$G(y) = H(y) + F(y).$$

In Equations 1 and 2, for each $y=c_k$, where $c_k$ is the encryption of $B_C[k]$, $x_j \in B_S[k]$, D is size of a $B_S$ bin and $k=[0,m)$. If $B_C[k] \in B_S[k]$, then $G(c_k) = H(x_j) = l'_j$ since $F(c_k) = 0$; if $B_C[k] \notin B_S[k]$, then $G(c_k)$ would be a random element in $\mathbb{F}_p$ since $F(c_k) \neq 0$, and r is random from $\mathbb{F}_p$.

In summary, Client C sends the encryption of each of its items $y \in Y$ using an agreed-upon Fully Homomorphic Encryption (FHE) scheme; server S sends back the results of homomorphically evaluated (F(y),G(y)) functions. Then, client C decrypts and obtains the evaluation of them, which is (0, l') if $y=x \in X$ (where l' is the label of x) or a pair of random elements from $\mathbb{F}_p$. While building this general protocol, CHLR18 leverages several optimization operations to compute this circuit computationally efficient, as discussed in the priority document.

The exemplary STLPSI protocol (by reference to CHLR18) allows client C and server S to input T subsamples (as items) of a query q and database entry $d_j$ for each $j \in [N]$, respectively, where each item is in $\mathcal{MS}$. Server S also pairs a label from $\mathcal{LS}_S$ for each of its subsamples. Moreover, Client C and Server S agree on a token $O^\lambda$.

In the STLPSI protocol, e.g., used in FLPSI:

(1) Server S constructs its hash tables (with multiple partitions), as CHLR18 does, but pre-computes only the coefficients of interpolating polynomial H(y) for each partition. In contrast, CHLR18 does not compute the F(y) polynomial as part of optimization to decrease the overall costs, nor does CHLR18 apply an OPRF to the data sets to simplify further processing. The STLPSI protocol, e.g., used in FLPSI, does not apply the CHLR18 OPRF as its set elements come into the protocol already processed with OPRF with the key chosen by Server S.

(2) Client C stores its items into a cuckoo hash table, as CHLR18 does, then sends the encryption of all necessary powers of the cuckoo hash table to Server S.

(3) For each partition, Server S sends the FHE evaluation of H(y) to Client C.

(4) After trying $$\binom{T}{t}$$

combinations over the H(y) results for all subsamples of q, client C can reconstruct a secret, which starts with the agreed token $O^\lambda$, if there are at least t matching subsamples from the database entry j. Otherwise, Client C would reconstruct a concatenation of two random elements from $\mathbb{F}_p$ (and will not be able to determine matching elements if fewer than t elements matched).

For correctness to hold, for each database entry $j \in [N]$, labels should be a set of Shamir's secret shares of $O^{\lambda \| l'_j}$, where $\lambda$ is a statistical security parameter and $l_j \in \mathcal{LS}$ is the label of $j^{th}$ entry in the database. Because each generated share in Shamir's secret sharing scheme is a randomly sampled element from the domain FP, Client C cannot distinguish an actual share from a random element from this domain. Hence, the FLPSI protocol satisfies the correctness requirement of STLPSI protocol.

Secret Sharing. For secret sharing, FPLSI uses t-out-of-T Shamir's secret sharing scheme as described in [37]. The output of secret sharing KS and the input labels of $S_{STLPSI}$ are from the same domain. Moreover, for client C to execute secret recovery KR in Step 7 (414), the output of $C_{STLPSI}$ and input of secret recovery KR should be from the same domain $\mathcal{LS}_S$, which is equal to the domain $\mathbb{F}_p$ of STLPSI's underlying FHE scheme.

FPLSI has target correctness having a maximum error rate of $\epsilon_1 = 0.001$ and $\epsilon_2 = 0.01$ for the smallest database.

Experimental Results and Examples

A study was conducted to evaluate the FPLSI protocol in the environment described in [7]. The study used an Azure F72s_v2 instance, which has 72 virtual cores equivalent to Intel Xeon Platinum 8168 and 144 GB of RAM each. The study evaluated the protocol over a fast network connection between C and S and over a slow network connection. While the former had a 500 MB/s connection with 0.5 ms latency, the latter had a 40 MB/s connection with 34 ms latency. The study used Ubuntu 18.04. The study restricted client C to a single thread to model a low computing resourced device (e.g., a mobile phone), while server S utilized up to 72 threads.

The FPLSI protocol in FIG. 4A was implemented on top of the homomorphic encryption library SEAL v3.2 [36], by using Brakerski/Fan-Vercauteren (BFV) scheme [15]. Moreover, the study used the Python implementation of FaceNet5, with the Inception-Resnet-V1 architecture [42], to extract embedding vectors. The study also used MTCNN to align faces in our datasets [52].

The various optimizations described herein were implemented in the test system.

The study evaluated an FLPSI implementation on large-scale facial databases, including up to $2^{20}$ people.

Training dataset. The DL model (used as a binary encoding model) was trained on the MSCeleb1M dataset, which includes over 8 million unconstrained facial images from around 100 thousand identities [19]

Query dataset. The study used YouTube Faces (YTF) academic benchmark dataset [46]. It contains noisy collections of unconstrained faces in video format from 1,595 public figures. The preprocessing may use multiple biometric scans per person to generate reliable bio-bit vectors. The study picked randomly picked $\mathcal{N}_{br}$ frames each for client C and server S to be used for testing true matches (or false non-matches). Hence, Client C always queries for these 1,595 people over any size of the database.

Database dataset. The study generated photo-realistic synthetic faces to simulate senders with big databases since there is no such big public datasets. The study used NVidia's face generator StyleGAN [25] to create databases of $\{2^{14}, 2^{16}, 2^{18}, 2^{20}\}$ identities along with users from YTF. This dataset was mainly created to measure the false matches per query and never used for querying.

The study used an existing model and weights trained on 70,000 high-quality images with a configuration that results in the lowest reported Fréchet inception distance (FID), which measures the quality between two datasets [12]. Hence, a lower FID means that the generated faces will have closer image quality or more similar statistics with the real faces. The study generated these faces in a machine with 64 GiB of memory, two GeForce GTX 1080 Ti graphics cards, and an Intel Core i7-7800X CPU running 64-bit Ubuntu 16.04.

Parameter choices for targeted errors. Table 1 provides a summary of a parameter searching method to find the ones achieving the targeted errors.

In Table 1, in addition to t and T, all parameters (L, $N_{br}$, $\tau_{rb}$, $N_{sb}$) employed in DL, SBLSH, and NR operations were evaluated to determine their effect on the errors of a query. The study first searched the parameters for a plaintext t-out-of-T matching to determine if the protocol can obtain the targeted errors without enabling privacy-preserving blocks in the first place. The values in Table 1 were established based on a search procedure.

TABLE 1

| Par. | Description | Value |
|---|---|---|
| t | matching threshold | 2 |
| T | number of subsamples | 64 |
| $\mathcal{L}$ | length of bio-bit-vectors | 256 |
| $\mathcal{N}_{br}$ | number of bio. readings | 10 |
| $\tau_{rb}$ | consistency threshold ratio | 0.9 |
| $\mathcal{N}_{sb}$ | number of subsampled bits | 14 |
| $k_S$ | key size of AES blockcipher | 128 |
| $\sigma$ | output of function $f_i$, $i \in [T]$ | $\|k_S\| - \log_2 T = 122$ |
| $\mathcal{P}$ | prime modulus of domain $\mathbb{F}_p$ | 8519681 |
| $\lambda$ | security parameter for token $0^\lambda$ | $\lfloor \log_2 \mathcal{P} \rfloor = 23$ |
| N | number of database entry | $\{2^{14}, 2^{16}, 2^{18}, 2^{20}\}$ |

Table 2 shows the experimental results of the FLPSI protocol.

TABLE 2

| Db setting | | | 2PC | Search (MB) | Total | Network |
|---|---|---|---|---|---|---|
| N | a | $B_a$ | (MB) | C→S/C←S | (MB) | fast/slow |
| $2^{14}$ | 128 | 4 | 8.5 | 0.5/16 | 25.0 | 0.1/0.6 s. |
| $2^{16}$ | 128 | 13 | 8.5 | 1.8/16 | 26.3 | 0.1/0.7 s. |
| $2^{18}$ | 128 | 46 | 8.5 | 5.4/16 | 29.9 | 0.1/0.8 s. |
| $2^{20}$ | 480 | 45 | 8.5 | 5.6/60 | 74.1 | 0.2/1.9 s. |

| Db setting | | | Computation (s.) | | | | | | Th = 72 & |
|---|---|---|---|---|---|---|---|---|---|
| N | a | $B_a$ | Th = 1 | 8 | 16 | 32 | 64 | 72 | Sp-up | fast/slow |
| $2^{14}$ | 128 | 4 | 1.01 | 0.21 | 0.14 | 0.11 | 0.07 | 0.05 | 20.20× | 0.15/0.65 s. |
| $2^{16}$ | 128 | 13 | 2.68 | 0.43 | 0.25 | 0.15 | 0.13 | 0.12 | 22.33× | 0.22/0.82 s. |
| $2^{18}$ | 128 | 46 | 8.73 | 1.28 | 0.73 | 0.45 | 0.36 | 0.36 | 24.25× | 0.46/1.16 s. |
| $2^{20}$ | 480 | 45 | 32.1 | 4.71 | 2.6 | 1.43 | 1.21 | 1.16 | 27.67× | 1.36/3.06 s. |

For each database of size N, Table 2 shows the constructed database settings, detailed communication and computation costs, and best achievable timings for the online phase. The database setting reflects the number of partitions (a) and the size of each partition ($B_a$). In Table 2, Columns "2PC" and "Search" refer to the data overhead of ($C_{AES}$, $S_{AES}$) and ($C_{STLPSI}$, $S_{STLPSI}$) protocols, respectively. Column "Network" measures the total data transmission time for the fast and slow networks. Column "Computation" measures the timings spent for the end-to-end computations, including the processes from both sides.

The study employed a fixed (8.5 MB per query) communication cost from extracting the subsamples of a single bio-bit-vector of client C through the 2PC ($C_{AES}$, $S_{AES}$) protocol. The cost is independent of the database size. FLPSI was observed to achieve at most a 74.1 MB per query communication cost, which shows that a system can not rely on a fast network connection for efficiency. The data communication only increased from 0.2 to 1.9 seconds per query when the test switched from the fast network to the slow network.

Computation cost. Even in the single-threaded server scenario, FLPSI was observed in the study to perform efficiently (at most 32.1 seconds). Given that most of the time was expended to homomorphically evaluate the polynomials on the server-side, multi-threading can be used to speed up the computation. Using 72 threads can achieve 27.67× faster computation compared to using a single thread on the server-side.

Moreover, since client C used a single thread and the server S cannot parallelize all sub-processes, the computation time does not decrease linearly as the number of threads is increased.

Best end-to-end timing. In Table 2, the best achievable timings for each of the database sizes are bolded. Overall, with server S using 72 threads, FLPSI can privately search a single person over a DB of 220 people in 1.36 sec. and 3.06 sec. with fast and slow network connections, respectively.

Table 3 show comparative performance results of the FPLSI with and without certain optimization operations described herein. From the comparative results, it is observed that C→S communication cost increases relative to Ba since client C sends more powers of its subsamples. It is also observed that C←S communication decreases linearly with a. Then, since the frequency/impact of C→S is greatly lower than that of C←S, decreasing C←S noticeably decreases the overall communication cost (e.g., from 522 MB to 74.1 MB per query). Similarly, decreasing the number of partitions speeds up computation since the server S has to evaluate fewer polynomials than it does before. Overall, FPLSI can speed up data transferring by 5.5× or 7.2× on fast/slow networks, respectively, and computation time can increase by 1.6× on a single-threaded server.

TABLE 3

| Db setting | | | Search (MB) | Total | Network | Comp. |
|---|---|---|---|---|---|---|
| N | a | $B_a$ | C→S/C←S | (MB) | fast/slow | Th = 1 |
| $2^{14}$ | 142 | 4 | 0.5/18 | 27 | 0.1/0.7 s. | 1.12 s. |
| $2^{16}$ | 602 | 3 | 0.4/75 | 84 | 0.2/2.2 s. | 3.98 s. |
| $2^{18}$ | 2493 | 3 | 0.4/312 | 321 | 0.7/8.4 s. | 16.5 s. |
| $2^{20}$ | 4096 | 7 | 0.9/513 | 522 | 1.1/13.7 s. | 51.3 s. |

Achieved error results. Table 4 shows the false rejection rates (FRR)s of a baseline plaintext matching system and the FLPSI protocol. Specifically, Table 4 shows the FRRs per query for the targeted false matches (at most 10 per query for any database size). These error rates have implications on the confidentiality of the database and nothing relevant to the query data, which is the first privacy goal of our protocol.

Revealing false matches (e.g., within industrial standards [2', 32', 45']) to the client is allowed since it is unavoidable in the desired application. Having said that, though FLPSI slightly increases the FRR errors compared to the baseline plaintext system, it still holds the correctness for all settings.

TABLE 4

| # of false matches | FRR (%) for Plaintext/FLPSI | | |
|---|---|---|---|
| | Face-10K | Face-100K | Face-1M |
| 1 | 2.89/2.95 | 2.93/2.97 | 2.99/3.01 |
| 2 | 1.62/1.65 | 1.86/1.95 | 2.13/2.18 |
| 3 | 1.26/1.32 | 1.64/1.66 | 1.97/2.01 |
| 4 | 1.06/1.14 | 1.39/1.42 | 1.55/1.56 |
| 5 | 0.92/1.01 | 1.14/1.18 | 1.18/1.25 |
| 6 | 0.81/0.85 | 0.94/0.97 | 1.06/1.12 |
| 7 | 0.72/0.77 | 0.83/0.86 | 0.92/0.94 |
| 8 | 0.56/0.59 | 0.74/0.79 | 0.87/0.92 |
| 9 | 0.53/0.58 | 0.69/0.74 | 0.73/0.79 |
| 10 | 0.51/0.56 | 0.58/0.63 | 0.67/0.75 |

FPLSI Cost. Table 5 shows experimental results of cost of the FLPSI protocol by the pre-processing operation performed at a server S. For various database size N, Table 5 shows the storage needs and preprocessing times for the offline phase, total online communication overhead, and end-to-end online computation times for different number of threads (Th). The results are averaged over 100 queries.

TABLE 5

| | Offline | | Online | Online response time (milliseconds) | | | | | | | |
|---|---|---|---|---|---|---|---|---|---|---|---|
| | Storage | Preprocess | comm. | Computation time with different number of threads | | | | | | Best query | |
| Database | (MB) | time (s.) | (MB) | Th = 1 | 8 | 16 | 32 | 64 | 72 | Sp-up | fast | slow |
| Face-10K | 5 | 0.94 | 12.1 | 523 | 93 | 68 | 46 | 57 | 56 | 11.4× | 47 | 146 |
| Face-100K | 51 | 4.07 | 20.4 | 4457 | 635 | 376 | 257 | 241 | 186 | 24.0× | 187 | 386 |
| Face-1M | 501 | 37.5 | 40.8 | 43956 | 5944 | 3058 | 1828 | 1647 | 1355 | 32.4× | 1455 | 1655 |

The study ran a one-time initialization phase (not shown) to compile the database from facial images. The protocols refresh t-out-of-T secret sharings and AES blockcipher key kS (both held by S) per query.

Comparison to Threshold Matching Approaches. Table 6 shows a comparison of concrete costs of FLPSI to other systems described in [4', 5', 23', 34', 47', 53', 75']. Notably, the FPLSI protocol has communication and computation costs that are linear relative to the database size. The FPLSI protocol can achieve between 1.7-99.2 sec. response times and 2.8-35.2 MB network overheads per query over an AT&T database.

Further, while most of these other systems do not satisfy certain e-correctness requirements, the exemplary FPLSI protocol does so while achieving 121×-7086× faster response time (14 ms. per query) and 7.18×-90.3× less communication for the same database.

TABLE 6

| Protocol | Communication (MB) | Saving | Resp. time (fast) (sec.) | Speed up |
|---|---|---|---|---|
| FLPSI | 0.39 | — | 0.014 | — |
| Yasuda et al. [75]† | 9.92 | 25.5× | 1.70 | 121× |
| Huang et al. [34]† | 17.9 | 46.0× | 6.08 | 434× |
| Osadchy et al. [47]† | 35.2 | 90.3× | 99.2 | 7086× |
| Blanton et al. [5] | 2.8 | 7.18× | 9.37 | 669× |
| Barai et al. [4]† | 9.11 | 23.4× | 16.0 | 1110× |
| Sadeghi et al. [53] | 2.8 | 7.18× | 15.5 | 1286× |
| Erkin et al. [23] | 7.3 | 18.7× | 18.0 | 1143× |

Comparison to t-out-of-T matching approaches. Systems described in [11',18',76'] (referred to as CH110,YSPW, CEC, respectively) are existing secure, t-out of-T protocols. Table 7 shows a comparison of the asymptotic communication and computation complexity of [11', 18', 76'] to the FPLSI protocol.

TABLE 7

| Protocol | Communication | Computation |
|---|---|---|
| FLPSI | $O\left(\frac{NT}{mB}\ell\right) \approx O(T\ell)$ | $O\left(\frac{NT}{m}\right)$ |
| CEC [11] | $O(N|\Sigma_{\mathcal{P}}|\ell)$ | $O(N(|\Sigma_{\mathcal{P}}| + T)T_e)$ |
| YSPW [76] | $O(NT^2\ell)$ | $O(N(\text{poly}(T) + T^2 T_e))$ |
| CH$_1$ [18] | $O(NT\ell)$ | $O\left(N\binom{T}{t}\text{poly}(T) + TT'_\varepsilon\right)$ |

It can be observed in Table 7 that FLPSI behaves better both in computation and communication than CH1, YSPW, and CEC protocols. Both communication and computation complexities appear to be growing in a linear manner with respect to database size.

While computation and communication of CEC [11] are linear also with the domain size, in concrete terms, CEC reports 3 GB communication for a database of 100 T-dimension vectors, where each vector item could be one of 4 distinct letters. Thus, CEC does not provide the same or comparable scaling as the FPLSI protocol (FLPSI operates in a domain with over 223 integers). CH1 [18] and YSPW [76] do not report concrete costs.

Discussion

Recent advances in deep learning (DL)-based biometric identification have made possible real-time identification of persons in footage collected by surveillance equipment. While real-time surveillance may be beneficial to public safety, there are serious objections due to privacy concerns. Tracking "persons of interest" may be warranted, but tracking everybody else in the process (i.e., dragnet surveillance) is too high of a price to pay.

The exemplary privacy-preserving real-time biometric search can evaluate a large database that contains biometric data such as facial photos and other info such as identities. The exemplary privacy-preserving search can query this database with biometric data extracted from real-time surveillance, such that only the identities of those who are captured by the surveillance sensors and are in the database would be revealed, but the identities of everyone else will remain secret.

In the literature, the problem of privately comparing or matching the inputs of two parties is extensively studied for various scenarios (e.g., contact list discovery, online dating services, etc.) in the context of private set intersection (PSI). A client C and a server S each hold a set of elements, and client C (or both parties) wants to privately compute the intersection of the sets. With labeled PSI (LPSI), server S has some auxiliary information (labels) corresponding to its set, and client C learns the labels corresponding to the intersection.

Current LPSI protocols are not suitable for the instant problem because they target exact matches, while biometric data should match in the presence of some noise (e.g., different lighting, ambient sounds, imprecise scans, etc.)

The fuzzy LPSI (FLPSI) protocol has two equally important requirements. First, the construction has to be efficient for demanding applications. Specifically, this requires a sublinear communication cost relative to the database, considering it could have more than a million records. Second, the protocol has to be specific security guarantees via proofs of security.

Certain state-of-the-art (L)PSI protocols [8, 9] are efficient in that they can achieve sublinear communication costs relative to the database, but do not support fuzzy matches. There are works on private fuzzy matching between two parties' data (e.g., images, voice, text, etc.). In general, parties produce feature vector representations of their data, and the computation is done over these vectors. The majority of prior art computes Euclidean distance or cosine similarity between vector pairs (one from each party), then looks for the closest one(s) by thresholding [1, 13, 20, 34] or using nearest neighbor search (NNS) [21, 41].

Though hand-crafted features such as Eigenfaces, Finger-Codes, or SIFT descriptors [28] could meet this application, they may not be efficient enough for a real-time search (over a DB of million scale). Recent efforts to outsource heavy computations [44, 50, 51, 53, 54] or to optimize approximate NNS [7, 33] lead to solutions with significantly lower computation costs. However, outsourcing requires an additional server getting all plaintext queries before conducting the search in the cloud (which violates the client's privacy), while [33] requires two non-colluding servers (which is hardly practical) and the protocols from [7] (SANNS) rely on a fast network connection (e.g., having a throughput from 4 to 56 gigabit/s) for efficiency as they have the communication costs of 1.59-5.4 GB to conduct a 10-NNS over a database of a million entries. Hence, even the improved solutions are not practical enough for our real-time privacy-preserving surveillance application.

The second line of work approaches the private fuzzy search problem as t-out-of-T matching [11, 18, 30, 48]. That is, client C wants to privately compute the intersection of the vectors (each with T items) by considering a match if any pair of vectors from both parties has at least t-out-of-T exactly matching items. There are two hurdles with using this approach. First, since all embeddings in two DL vectors, extracted from even consequently captured facial photos, will not be equal (but will be close) due to continuous (or non-discrete) nature of Euclidean space, they do not accommodate t-out-of-T matching. Second, to the inventor's knowledge, existing approaches are not efficient and require at least a linear communication cost relative to the database (see [48] for comparison).

There are works on fuzzy searchable encryption [2, 27], but these are for a different setting where the party making queries owns the data, even though the data is stored on an untrusted server.

While the above-discussed techniques may not be solely used for the applications discussed herein, portions of them may nevertheless be employed in the FPLSI protocol, as discussed herein, or as alternative design choices.

It should be appreciated that the logical operations described above and in the appendix can be implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as state operations, acts, or modules. These operations, acts and/or modules can be implemented in software, in firmware, in special purpose digital logic, in hardware, and any combination thereof. It should also be appreciated that more or fewer operations can be performed than shown in the figures and described herein. These operations can also be performed in a different order than those described herein.

Various computing systems may be employed to implement the exemplary system and method described herein. The computing device may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device to provide the functionality of a number of servers that is not directly bound to the number of computers in the computing device. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or maybe hired on an as-needed basis from a third-party provider. Some cloud computing environments may comprise cloud computing resources owned and operated by the enterprise as well as cloud computing resources hired and/or leased from a third-party provider.

In its most basic configuration, a computing device typically includes at least one processing unit and system memory. Depending on the exact configuration and type of computing device, system memory may be volatile (such as random-access memory (RAM)), non-volatile (such as read-only memory (ROM), flash memory, etc.), or some combination of the two. The processing unit(s) may be a standard programmable processor that performs arithmetic and logic operations necessary for the operation of the computing device. As used herein, processing unit and processor refers to a physical hardware device that executes encoded instructions for performing functions on inputs and creating outputs, including, for example, but not limited to, microprocessors (MCUs), microcontrollers, graphical processing units (GPUs), and application-specific circuits (ASICs). Thus, while instructions may be discussed as executed by a processor, the instructions may be executed simultaneously, serially, or otherwise executed by one or multiple processors. The computing device 200 may also include a bus or other communication mechanism for communicating information among various components of the computing device.

The computing device may have additional features/functionality. For example, computing devices may include additional storage such as removable storage and non-removable storage including, but not limited to, magnetic or optical disks or tapes. The computing device may also contain network connection(s) that allow the device to communicate with other devices, such as over the communication pathways described herein. The network connection(s) may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The computing device may also have input device(s) 270 such as keyboards, keypads, switches, dials, mice, trackballs, touch screens, voice recognizers, card readers, paper tape readers, or other well-known input devices. Output device(s) 260 such as printers, video monitors, liquid crystal displays (LCDs), touch screen displays, displays, speakers, etc., may also be included. The additional devices may be connected to the bus in order to facilitate the communication of data among the components of the computing device. All these devices are well known in the art and need not be discussed at length here.

The processing unit may be configured to execute program code encoded in tangible, computer-readable media. Tangible, computer-readable media refers to any media that is capable of providing data that causes the computing device (i.e., a machine) to operate in a particular fashion. Various computer-readable media may be utilized to provide instructions to the processing unit for execution. Example tangible, computer-readable media may include but is are not limited to volatile media, non-volatile media, removable media, and non-removable media implemented in any method or technology for storage of information such as computer-readable instructions, data structures, program modules, or other data. System memory 230, removable storage, and non-removable storage are all examples of tangible computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In light of the above, it should be appreciated that many types of physical transformations take place in the computer architecture in order to store and execute the software components presented herein. It also should be appreciated that the computer architecture may include other types of computing devices, including hand-held computers, embedded computer systems, personal digital assistants, and other types of computing devices known to those skilled in the art.

In an example implementation, the processing unit may execute program code stored in the system memory. For example, the bus may carry data to the system memory, from which the processing unit receives and executes instructions.

The data received by the system memory may optionally be stored on the removable storage or the non-removable storage before or after execution by the processing unit.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and it may be combined with hardware implementations.

It should be appreciated that any of the components or modules referred to with regards to any of the present embodiments discussed herein may be integrally or separately formed with one another. Further, redundant functions or structures of the components or modules may be implemented. Moreover, the various components may be communicated locally and/or remotely with any user/clinician/patient or machine/system/computer/processor.

Moreover, the various components may be in communication via wireless and/or hardwire or other desirable and available communication means, systems, and hardware. Moreover, various components and modules may be substituted with other modules or components that provide similar functions.

Although example embodiments of the present disclosure are explained in some instances in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an," and "the" include plural referents unless the context clearly dictates otherwise. Ranges may be expressed herein as from "about" or "5 approximately" one particular value and/or to "about" or "approximately" another particular value. When such a range is expressed, other exemplary embodiments include from the one particular value and/or to the other particular value.

By "comprising" or "containing" or "including" is meant that at least the name compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

The following patents, applications and publications as listed below and throughout this document are hereby incorporated by reference in their entirety herein.

REFERENCES

[1] Mauro Barni, Tiziano Bianchi, Dario Catalano, Mario Di Raimondo, Ruggero Donida Labati, Pierluigi Failla, Dario Fiore, Riccardo Lazzeretti, Vincenzo Piuri, Fabio Scotti, et al. 2010. Privacy-preserving fingercode authentication. In Proceedings of the 12th ACM workshop on Multimedia and security. 231-240.

[2] Alexandra Boldyreva and Nathan Chenette. 2014. Efficient fuzzy search on encrypted data. In International Workshop on Fast Software Encryption. Springer, 613-633.

[3] Kevin W Bowyer, Karen Hollingsworth, and Patrick J Flynn. 2008. Image understanding for iris biometrics: A survey. Computer vision and image understanding 110, 2 (2008), 281-307.

[4] Zvika Brakerski, Craig Gentry, and Vinod Vaikuntanathan. 2014. (Leveled) fully homomorphic encryption without bootstrapping. ACM Transactions on Computation Theory (TOCT) 6, 3 (2014), 1-36.

[5] Moses S Charikar. 2002. Similarity estimation techniques from rounding algorithms. In Proceedings of the thiry-fourth annual ACM symposium on Theory of computing. 380-388.

[6] Melissa Chase, Hao Chen, Jintai Ding, Shafi Goldwasser, Sergey Gorbunov, Jeffrey Hoffstein, Kristin Lauter, Satya Lokam, Dustin Moody, Travis Morrison, et al. 2017. Security of homomorphic encryption. HomomorphicEncryption. org, Redmond WA, Tech. Rep (2017).

[7] Hao Chen, Ilaria Chillotti, Yihe Dong, Oxana Poburinnaya, Ilya Razenshteyn, and M. Sadegh Riazi. 2020. SANNS: Scaling Up Secure Approximate k-Nearest Neighbors Search. In 29th USENIX Security Symposium (USENIX Security 20). USENIX Association, Boston, MA. haps://www.usenix.org/conference/usenixsecurity20/presentation/chen-hao

[8] Hao Chen, Kyoohyung Han, Zhicong Huang, Amir Jalali, and Kim Laine. 2017. Simple encrypted arithmetic library v2. 3.0. Microsoft (2017).

[9] Hao Chen, Zhicong Huang, Kim Laine, and Peter Rindal. 2018. Labeled PSI from Fully Homomorphic Encryption with Malicious Security. In Proceedings of the 2018 ACM SIGSAC Conference on Computer and Communications Security. ACM, 1223-1237.

[10] Hao Chen, Kim Laine, and Peter Rindal. 2017. Fast private set intersection from homomorphic encryption. In Proceedings of the 2017 ACM SIGSAC Conference on Computer and Communications Security. ACM, 1243-1255.

[11] Lukasz Chmielewski and Jaap-Henk Hoepman. 2008. Fuzzy private matching. In 2008 Third International Conference on Availability, Reliability and Security. IEEE, 327-334.

[12] DC Dowson and BV Landau. 1982. The Fréchet distance between multivariate normal distributions. Journal of multivariate analysis 12, 3 (1982), 450-455.

[13] Zekeriya Erkin, Martin Franz, Jorge Guajardo, Stefan Katzenbeisser, Inald Lagendijk, and Tomas Toft. 2009. Privacy-preserving face recognition. In International symposium on privacy enhancing technologies symposium. Springer, 235-253.

[14] David Evans, Vladimir Kolesnikov, and Mike Rosulek. 2018. A Pragmatic Introduction to Secure Multi-Party Computation. Foundations and Trends® in Privacyand Security 2, 2-3 (2018), 70-246. https://doi.org/10.1561/3300000019

[15] Junfeng Fan and Frederik Vercauteren. 2012. Somewhat Practical Fully Homomorphic Encryption. IACR Cryptology ePrint Archive 2012 (2012), 144.

[16] Matt Fredrikson, Somesh Jha, and Thomas Ristenpart. 2015. Model inversion attacks that exploit confidence information and basic countermeasures. In Proceedings of the 22nd ACM SIGSAC Conference on Computer and Communications Security. 1322-1333.

[17] Michael J Freedman, Yuval Ishai, Benny Pinkas, and Omer Reingold. 2005. Keyword search and oblivious pseudorandom functions. In Theory of Cryptography Conference. Springer, 303-324.

[18] Michael J Freedman, Kobbi Nissim, and Benny Pinkas. 2004. Efficient private matching and set intersection. In International conference on the theory and applications of cryptographic techniques. Springer, 1-19.

[19] Yandong Guo, Lei Zhang, Yuxiao Hu, Xiaodong He, and Jianfeng Gao. 2016. Msceleb-1m: A dataset and benchmark for large-scale face recognition. In European Conference on Computer Vision. Springer, 87-102.

[20] Yan Huang, Lior Malka, David Evans, and Jonathan Katz. 2011. Efficient privacypreserving biometric identification. In Proceedings of the 17th conference Network and Distributed System Security Symposium, NDSS, Vol. 68.

[21] Piotr Indyk and David Woodruff. 2006. Polylogarithmic private approximations and efficient matching. In Theory of Cryptography Conference. Springer, 245-264.

[22] Mihaela Ion, Ben Kreuter, Erhan Nergiz, Sarvar Patel, Shobhit Saxena, Karn Seth, David Shanahan, and Moti Yung. 2017. Private Intersection-Sum Protocol with Applications to Attributing Aggregate Ad Conversions. IACR Cryptology ePrint Archive 2017 (2017), 738.

[23] Stanislaw Jarecki and Xiaomin Liu. 2010. Fast secure computation of set intersection. In International Conference on Security and Cryptography for Networks. Springer, 418-435.

[24] Jianqiu Ji, Jianmin Li, Shuicheng Yan, Bo Zhang, and Qi Tian. 2012. Super-bit locality-sensitive hashing. In Advances in Neural Information Processing Systems. 108-116.

[25] Tero Karras, Samuli Laine, and Timo Aila. 2018. A style-based generator architecture for generative adversarial networks. arXiv preprint arXiv:1812.04948 (2018).

[26] Brian Kulis and Kristen Grauman 2009. Kernelized locality-sensitive hashing for scalable image search. In 2009 IEEE 12th international conference on computer vision. IEEE, 2130-2137.

[27] Mehmet Kuzu, Saiful Islam, and Murat Kantarcioglu. 2012. Efficient Similarity Search over Encrypted Data. In 2012 IEEE 28th International Conference on Data Engineering. 1156-1167.

[28] David G Lowe. 1999. Object recognition from local scale-invariant features. In Proceedings of the seventh IEEE international conference on computer vision, Vol. 2. Ieee, 1150-1157.

[29] Erik Meijering. 2002. A chronology of interpolation: from ancient astronomy to modern signal and image processing. Proc. IEEE 90, 3 (2002), 319-342.

[30] Margarita Osadchy, Benny Pinkas, Ayman Jarrous, and Boaz Moskovich. 2010. Scifi-a system for secure face identification. In 2010 IEEE Symposium on Security and Privacy. IEEE, 239-254.

[31] Benny Pinkas, Thomas Schneider, Gil Segev, and Michael Zohner. 2015. Phasing: Private set intersection using permutation-based hashing. In 24th {USENIX} Security Symposium ({USENIX} Security 15). 515-530.

[32] Amanda C Davi Resende and Diego F Aranha. 2018. Faster unbalanced private set intersection. In International Conference on Financial Cryptography and Data Security. Springer, 203-221.

[33] M. Sadegh Riazi, Beidi Chen, Anshumali Shrivastava, Dan S. Wallach, and Farinaz Koushanfar. 2016. Sublinear Privacy-preserving Search with Untrusted Server and Semi-honest Parties. CoRR abs/1612.01835 (2016). http://arxiv.org/abs/1612.01835

[34] Ahmad-Reza Sadeghi, Thomas Schneider, and Immo Wehrenberg. 2009. Efficient privacy-preserving face recognition. In International Conference on Information Security and Cryptology. Springer, 229-244.

[35] Florian Schroff, Dmitry Kalenichenko, and James Philbin. 2015. Facenet: A unified embedding for face recognition and clustering. In Proceedings of the IEEE conference on computer vision and pattern recognition. 815-823.

[36] SEAL 2019. Microsoft SEAL (release 3.2). https://github.com/Microsoft/SEAL. (February 2019). Microsoft Research, Redmond, WA.

[37] Adi Shamir 1979. How to share a secret. Commun. ACM 22, 11 (1979), 612-613.

[38] Reza Shokri, Marco Stronati, Congzheng Song, and Vitaly Shmatikov. 2017. Membership inference attacks against machine learning models. In 2017 IEEE Symposium on Security and Privacy (SP). IEEE, 3-18.

[39] Sailesh Simhadri, James Steel, and Benjamin Fuller. 2019. Cryptographic Authentication from the Iris. In International Conference on Information Security. Springer, 465-485.

[40] Nigel P Smart and Frederik Vercauteren. 2014. Fully homomorphic SIMD operations. Designs, codes and cryptography 71, 1 (2014), 57-81.

[41] Ebrahim M Songhori, Siam U Hussain, Ahmad-Reza Sadeghi, and Farinaz Koushanfar. 2015. Compacting privacy-preserving k-nearest neighbor search using logic synthesis. In 2015 52nd ACM/EDAC/IEEE Design Automation Conference (DAC). IEEE, 1-6.

[42] Christian Szegedy, Sergey Ioffe, Vincent Vanhoucke, and Alexander A Alemi. 2017. Inception-v4, inception-resnet and the impact of residual connections on learning. In AAAI, Vol. 4.12.

[43] Paul Viola and Michael J Jones. 2004. Robust real-time face detection. International journal of computer vision 57, 2 (2004), 137-154.

[44] QianWang, Shengshan Hu, Kui Ren, Meiqi He, Minxin Du, and ZhiboWang. 2015. CloudBI: Practical privacy-preserving outsourcing of biometric identification in the cloud. In European Symposium on Research in Computer Security. Springer, 186-205.

[45] Xiao Wang, Alex J. Malozemoff, and Jonathan Katz. 2016. EMP-toolkit: Efficient MultiParty computation toolkit. https://github.com/emp-toolkit. (2016).

[46] Lior Wolf, Tal Hassner, and Itay Maoz. 2011. Face recognition in unconstrained videos with matched background similarity In Computer Vision and Pattern Recognition (CVPR), 2011 IEEE Conference on. IEEE, 529-534.

[47] Andrew Chi-Chih Yao. 1986. How to generate and exchange secrets. In 27th Annual Symposium on Foundations of Computer Science (sfcs 1986). IEEE, 162-167.

[48] Qingsong Ye, Ron Steinfeld, Josef Pieprzyk, and Huaxiong Wang. 2009. Efficient fuzzy matching and intersection on private datasets. In International Conference on Information Security and Cryptology. Springer, 211-228. Security 2, 2-3 (2018), 70-246. https://doi.org/10.1561/3300000019

[49] Xinyang Yi, Constantine Caramanis, and Eric Price. 2015. Binary embedding: Fundamental limits and fast algorithm. In International Conference on Machine Learning. 2162-2170.

[50] Jiawei Yuan and Shucheng Yu. 2013. Efficient privacy-preserving biometric identification in cloud computing. In 2013 Proceedings IEEE INFOCOM. IEEE, 2652-2660.

[51] Chuan Zhang, Liehuang Zhu, and Chang Xu. 2017. PTBI: An efficient privacypreserving biometric identification based on perturbed term in the cloud. Information Sciences 409 (2017), 56-67.

[52] Kaipeng Zhang, Zhanpeng Zhang, Zhifeng Li, and Yu Qiao. 2016. Joint face detection and alignment using multitask cascaded convolutional networks. IEEE Signal Processing Letters 23, 10 (2016), 1499-1503.

[53] Liehuang Zhu, Chuan Zhang, Chang Xu, Ximeng Liu, and Cheng Huang. 2018. An efficient and privacy-preserving biometric identification scheme in cloud computing. IEEE Access 6 (2018), 19025-19033.

[54] Youwen Zhu, Zhikuan Wang, and Jian Wang. 2016. Collusion-resisting secure nearest neighbor query over encrypted data in cloud, revisited. In 2016 IEEE/ACM 24th International Symposium on Quality of Service (IWQoS). IEEE, 1-6.

[1'] M. R. Albrecht, R. Player, and S. Scott. On the concrete hardness of learning with errors. Journal of Mathematical Cryptology, 9(3):169-203, 2015.

[2'] Android Open Source Project. Biometric security, 2020. https://source.android.com/security/biometric/measure.

[3'] A. Babenko and V. Lempitsky. Efficient indexing of billion-scale datasets of deep descriptors. In IEEE CVPR, 2016.

[4'] M. Barni, T. Bianchi, D. Catalano, M. Di Raimondo, R. Donida Labati, P. Failla, D. Fiore, R. Lazzeretti, V. Piuri, F. Scotti, et al. Privacypreserving fingercode authentication. In MM&Sec, 2010.

[5'] M. Blanton and P. Gasti. Secure and efficient protocols for iris and fingerprint identification. In ESORICS. Springer, 2011.

[6'] A. Boldyreva and N. Chenette. Efficient fuzzy search on encrypted data. In International Workshop on FSE. Springer, 2014.

[7'] K. W. Bowyer, K. Hollingsworth, and P. J. Flynn. Image understanding for iris biometrics: A survey. CVIU, 110 (2):281-307, 2008.

[8'] Z. Brakerski, C. Gentry, and S. Halevi. Packed ciphertexts in lwe-based homomorphic encryption. In International Workshop on Public Key Cryptography, pages 1-13. Springer, 2013.

['9] Z. Brakerski, C. Gentry, and V. Vaikuntanathan. (leveled) fully homomorphic encryption without bootstrapping. TOCT, 6(3):1-36, 2014.

[10'] Business Insider. https://www.businessinsider.com/senate-bill-sanders-merkley-ban-corporate-facial-recognition-without-consent-2020-8.

[11'] I. Calapodescu, S. Estehghari, and J. Clier. Compact fuzzy private matching using a fully-homomorphic encryption scheme, Aug. 29 2017. U.S. Pat. No. 9,749, 128.

[12'] R. Canetti, B. Fuller, O. Paneth, L. Reyzin, and A. Smith. Reusable fuzzy extractors for low-entropy distributions. In EUROCRYPT, 2016.

[13'] M. S. Charikar Similarity estimation techniques from rounding algorithms In STOC, 2002.

[14'] M. Chase, H. Chen, J. Ding, S. Goldwasser, S. Gorbunov, J. Hoffstein, K. Lauter, S. Lokam, D. Moody, T. Morrison, et al. Security of homomorphic encryption. HomomorphicEncryption.org, Tech. Rep, 2017.

[15'] H. Chen, I. Chillotti,Y. Dong, O. Poburinnaya, I. Razenshteyn, and M. S. Riazi. SANNS: Scaling up secure approximate k-nearest neighbors search. In USENIX Security, 2020.

[16'] H. Chen, Z. Huang, K. Laine, and P. Rindal. Labeled psi from fully homomorphic encryption with malicious security. In CCS, 2018.

[17'] H. Chen, K. Laine, and P. Rindal. Fast private set intersection from homomorphic encryption. In CCS, 2017.

[18'] L. Chmielewski and J.-H. Hoepman. Fuzzy private matching. In ARES, 2008.

[19'] D. Demmler, T. Schneider, and M. Zohner. Aby-a framework for efficient mixed-protocol secure two-party computation. In NDSS, 2015.

[20'] Y. Dodis, L. Reyzin, and A. Smith. Fuzzy extractors: How to generate strong keys from biometrics and other noisy data. In EUROCRYPT, 2004.

[21'] Z. Dong, C. Jing, M. Pei, and Y. Jia. Deep cnn based binary hash video representations for face retrieval. Pattern Recognition, 81, 2018.

[22'] L. Ducas and D. Stehle. Sanitization of the ciphertexts. In Annual International Conference on the Theory and Applications of Cryptographic Techniques, pages 294-310. Springer, 2016.

[23'] Z. Erkin, M. Franz, J. Guajardo, S. Katzenbeisser, I. Lagendijk, and T. Toft. Privacy-preserving face recognition. In PETS, 2009.

[24'] D. Evans, V. Kolesnikov, and M. Rosulek. A pragmatic introduction to secure multi-party computation. FnT Privacy and Security, 2,2018.

[25'] J. Fan and F. Vercauteren. Somewhat practical fully homomorphic encryption. IACR Cryptology ePrint Archive, 2012:144, 2012.

[26'] J. Feigenbaum, Y. Ishai, T. Malkin, K. Nissim, M. J. Strauss, and R. N. Wright. Secure multiparty computation of approximations. ACM Trans. Algorithms, 2(3):435-472, July 2006.

[27'] M. Fredrikson, S. Jha, and T. Ristenpart. Model inversion attacks that exploit confidence information and basic countermeasures. In CCS, pages 1322-1333, 2015.

[28'] M. J. Freedman, Y. Ishai, B. Pinkas, and O. Reingold. Keyword search and oblivious pseudorandom functions. In TCC, 2005.

[29'] M. J. Freedman, K. Nissim, and B. Pinkas. Efficient private matching and set intersection. In EUROCRYPT, 2004.

[30'] C. Gentry, S. Halevi, and N. P. Smart. Homomorphic evaluation of the aes circuit. In Annual Cryptology Conference, pages 850-867. Springer, 2012.

[31'] R. Gilad-Bachrach, N. Dowlin, K. Laine, K. Lauter, M. Naehrig, and J. Wernsing. Cryptonets: Applying neural networks to encrypted data with high throughput and accuracy. In International Conference on Machine Learning, pages 201-210. PMLR, 2016.

[32'] P. Grother, P. Grother, M. Ngan, and K. Hanaoka. Face recognition vendor test (frvt) part 2: Identification. NIST, 2019.

[33'] Y. Guo, L. Zhang, Y. Hu, X. He, and J. Gao. Ms-celeb-1m: A dataset and benchmark for large-scale face recognition. In ECCV, 2016.

[34'] Y. Huang, D. Evans, J. Katz, and L. Malka. Faster secure two-party computation using garbled circuits. In USENIX, pages 331-335, 2011.

[35'] Y. Huang, L. Malka, D. Evans, and J. Katz. Efficient privacy-preserving biometric identification. In NDSS, 2011.

[36'] P. Indyk and R. Motwani. Approximate nearest neighbors: towards removing the curse of dimensionality. In Proceedings of the thirtieth annual ACM symposium on Theory of computing, pages 604-613, 1998.

[37'] P. Indyk and D. Woodruff. Polylogarithmic private approximations and efficient matching. In TCC, 2006.

[38'] J. Ji, J. Li, S. Yan, B. Zhang, and Q. Tian. Super-bit locality-sensitive hashing. In NIPS, pages 108-116, 2012.

[39'] R. Ji, H. Liu, L. Cao, D. Liu, Y. Wu, and F. Huang. Toward optimal manifold hashing via discrete locally linear embedding. IEEE Transactions on Image Processing, 26(11):5411-5420, 2017.

[40'] T. Karras, S. Laine, and T. Aila. A style-based generator architecture for generative adversarial networks. In CVPR, pages 4401-4410, 2019.

[41'] V. Kolesnikov, R. Kumaresan, M. Rosulek, and N. Trieu. Efficient batched oblivious prf with applications to private set intersection. In CCS, 2016.

[42'] B. Kulis and K. Grauman. Kernelized locality-sensitive hashing for scalable image search. In IEEE ICCV, pages 2130-2137, 2009.

[43'] M. Kuzu, S. Islam, and M. Kantarcioglu. Efficient similarity search over encrypted data. In IEEE ICDE, 2012.

[44'] E. Meijering. A chronology of interpolation: from ancient astronomy to modern signal and image processing. Proc. IEEE, 2002.

[45'] Microsoft. Biometric requirements, 2020. https://docs.microsoft.com/en-us/windows-hardware/design/device-experiences/windows-hello-biometric-requirements.

[46'] M. Norouzi, D. J. Fleet, and R. R. Salakhutdinov Hamming distance metric learning. In Advances in neural information processing systems, pages 1061-1069, 2012.

[47'] M. Osadchy, B. Pinkas, A. Jarrous, and B. Moskovich. Scifi-a system for secure face identification. In IEEE S&P, 2010.

[48'] B. Pinkas, T. Schneider, G. Segev, and M. Zohner. Phasing: Private set intersection using permutation-based hashing. In USENIX, 2015.

[49'] B. Pinkas, T. Schneider, C. Weinert, and U. Wieder. Efficient circuitbased psi via cuckoo hashing. In EUROCRYPT, 2018.

[50'] B. Pinkas, T. Schneider, and M. Zohner. Faster private set intersection based on fOTg extension. In 23rd fUSENIXg Security Symposium (fUSENIXg Security 14), pages 797-812, 2014.

[51'] M. Raginsky and S. Lazebnik. Locality-sensitive binary codes from shift-invariant kernels. Advances in neural information processing systems, 22:1509-1517, 2009.

[52'] M. S. Riazi, B. Chen, A. Shrivastava, D. S. Wallach, and F. Koushanfar. Sub-linear privacy-preserving search with untrusted server and semihonest parties. CoRR, 2016.

[53'] A.-R. Sadeghi, T. Schneider, and I. Wehrenberg. Efficient privacypreserving face recognition. In ICISC, 2009.

[54'] F. S. Samaria and A. C. Harter. Parameterisation of a stochastic model for human face identification. In IEEE WACV, 1994.

[55'] F. Schroff, D. Kalenichenko, and J. Philbin. Facenet: A unified embedding for face recognition and clustering. In IEEE CVPR, 2015.

[56'] Microsoft SEAL (release 3.5). https://github.com/Microsfot/SEAL, August 2020. Microsoft Research, Redmond, WA.

[57'] A. Shamir How to share a secret. Commun. ACM, 1979.

[58'] R. Shokri, M. Stronati, C. Song, and V. Shmatikov. Membership inference attacks against machine learning models. In IEEE S&P, 2017.

[59'] S. Simhadri, J. Steel, and B. Fuller. Cryptographic authentication from the iris. In ISC, pages 465-485. Springer, 2019.

[60'] N. P. Smart and F. Vercauteren. Fully homomorphic simd operations. Designs, codes and cryptography, 71(1): 57-81, 2014.

[61'] E. M. Songhori, S. U. Hussain, A.-R. Sadeghi, and F. Koushanfar. Compacting privacy-preserving k-nearest neighbor search using logic synthesis. In IEEE DAC, 2015.

[62'] J. Su, D. V. Vargas, and K. Sakurai. One pixel attack for fooling deep neural networks. IEEE TEVC, 2019.

[63'] C. Szegedy, S. Ioffe, V. Vanhoucke, and A. A. Alemi. Inception-v4, inception-resnet and the impact of residual connections on learning. In AAAI, volume 4, page 12, 2017.

[64'] The Guardian. haps://www.theguardian.com/technology/2020/aug/11/south-wales-police-lose-landmark-facial-recognition-case, June 2020.

[65'] The Intercept. haps://theintercept.com/2018/05/30/face-recognition-schools-school-shootings/, December 2020.

[66'] The NYT. https://www.nytimes.com/2020/01/18/technology/clearview-privacy-facial-recognition.html, June 2020.

[67'] The Verge. Moscow's facial recognition system can be hijacked. https://www.theverge.com/2020/11/11/21561018/moscows-facial-recognition-system-crime-bribe-stalking, December 2020.

[68'] E. Uzun, C. Yagemann, S. Chung, V. Kolesnikov, and W. Lee. Cryptographic key derivation from biometric inferences for remote authentication. In ASIACCS, 2021.

[69'] P. Viola and M. J. Jones. Robust real-time face detection. International journal of computer vision, 57(2):137-154, 2004.

[70'] Y. Vizilter, V. Gorbatsevich, A. Vorotnikov, and N. Kostromov. Realtime face identification via cnn and boosted hashing forest. In IEEE CVPR Workshops, pages 78-86, 2016.

[71'] J. Wang, T. Zhang, N. Sebe, H. T. Shen, et al. A survey on learning to hash. IEEE TPAMI, 40(4):769-790, 2017.

[72'] Q.Wang, S. Hu, K. Ren, M. He, M. Du. and Z.Wang. Cloudbi: Practical privacy-preserving outsourcing of biometric identification in the cloud. In ESORICS, 2015.

[73'] X. Wang, A. J. Malozemoff, and J. Katz. EMP-toolkit. https://github.com/emp-toolkit, 2016.

[74'] L. Wolf, T. Hassner, and I. Maoz. Face recognition in unconstrained videos with matched background similarity. In IEEE CVPR, 2011.

[75'] M. Yasuda. Secure hamming distance computation for biometrics using ideal-lattice and ring-lwe homomorphic encryption. Information Security Journal: A Global Perspective, 26(2):85-103, 2017.

[76'] Q. Ye, R. Steinfeld, J. Pieprzyk, and H.Wang. Efficient fuzzy matching and intersection on private datasets. In ISISC, 2009.

[77'] X. Yi, C. Caramanis, and E. Price. Binary embedding: Fundamental limits and fast algorithm. In ICML, pages 2162-2170, 2015.

[78'] J. Yuan and S. Yu. Efficient privacy-preserving biometric identification in cloud computing. In IEEE INFOCOM, 2013.

[79'] C. Zhang, L. Zhu, and C. Xu. Ptbi: An efficient privacy-preserving biometric identification based on perturbed term in the cloud. IS, 2017.

[80'] K. Zhang, Z. Zhang, Z. Li, and Y. Qiao. Joint face detection and alignment using multitask cascaded convolutional networks. IEEE Signal Processing Letters, 23(10):1499-1503, 2016.

[81'] L. Zhu, C. Zhang, C. Xu, X. Liu, and C. Huang. An efficient and privacy-preserving biometric identification scheme in cloud computing. IEEE Access, 6:19025-19033, 2018.

[82'] Y. Zhu, Z. Wang, and J. Wang. Collusion-resisting secure nearest neighbor query over encrypted data in cloud, revisited. In IEEE/ACM IWQoS, 2016.

What is claimed is:

1. A method to conduct a privacy-preserving search that reveals a matched label to a client while maintaining confidentiality of a searched query in a database, the method comprising:

receiving a first biometric data in a privacy-preserving query client to be queried in the privacy-preserving search;

generating a binary encoded biometric bit vector from the first biometric data using a binary encoding model, wherein the binary encoded biometric bit vector comprises a set of bits of pre-defined length;

generating a plurality of altered binary encoded bit vectors by varying one or more bits of the binary encoded biometric bit vector via a local-sensitivity hash operation;

converting the plurality of altered binary encoded bit vectors to a plurality of first Hamming encoded data; and transmitting a portion or all of the plurality of first Hamming encoded data associated with the first biometric data to a privacy-preserving query server operatively coupled to the database of a plurality of second biometric data, wherein each of the plurality of second biometric data has at least one corresponding identifier label, and wherein each of the plurality of second biometric data of the database had been converted a second Hamming encoded data using a second binary encoding model;

wherein the privacy-preserving query server assesses a closeness metric between the transmitted plurality of first Hamming encoded data, or a first set of masked data generated therefrom, and second Hamming encoded data of each, or a portion, of the plurality of second biometric data of the database, or a second set of masked data generated therefrom, and wherein the closeness metric is used to determine an identifier label for a matching first and second Hamming encoded data, or the first and second set of masked data generated therefrom.

2. The method of claim 1, wherein the plurality of Hamming encoded data, or a set of masked data generated therefrom, associated with the first biometric data are encrypted prior to being transmitted to the privacy-preserving query server.

3. The method of claim 1, wherein the closeness metric is based on a fuzzy matching operation.

4. The method of claim 3, wherein each identifier label on the database is converted into t-out-of-T secret shares, wherein the t-out-of-T secret shares are associated with the second set of masked Hamming encoded data, wherein the identifier is only matched if at least t secret shares of the t-out-of-T secret shares are obtained.

5. The method of claim 1, wherein converting the plurality of altered binary encoded bit vectors to a plurality of first Hamming encoded data employs a Super-Bit Locality Sensitive Hash (SBLSH) operation.

6. The method of claim 1, wherein the second Hamming encoded data, or a set of masked data generated therefrom, of each of the plurality of second biometric data are encrypted as masked data.

7. The method of claim 1, wherein the binary encoded biometric bit vector is generated from the first biometric data using at least one of a deep learning model, a locality sensitivity hashing algorithm, or a binary learning model.

8. The method of claim 1, wherein the first biometric data comprises image data.

9. The method of claim 1, wherein the first binary encoding model and the second binary encoding model are the same.

10. The method of claim 1, wherein the generating the plurality of altered binary encoded bit vectors by the client and the privacy-preserving query server, respectively, employs a first random projection masks and a second random projection masks, wherein the first random projection masks and the second random projection masks are the same.

11. The method of claim 1, wherein the first biometric data comprises at least one of facial scan or images, fingerprint scan or images, retinal scan or images, voice data, handwriting data, or DNA sequence data.

12. The method of claim 1, wherein the privacy-preserving search is used for surveillance or for identification in an investigation.

13. The method of claim 1, wherein the plurality of first Hamming encoded data, or the first set masked data generated therefrom, are evaluated in a batch operation with other Hamming encoded data or a set of masked data generated therefrom.

14. A method of operating a privacy-preserving query server to conduct a privacy-preserving search that reveals a matched label to a client while maintaining confidentiality of a searched query in a database, the method comprising:

retrieving a plurality of biometric data for a plurality of individuals, including a first biometric data for a first individual and a second biometric data for a second individual;

for each of the plurality of biometric data, generating a binary encoded biometric bit vector using a first binary encoding model, including a first binary encoded biometric bit vector for the first biometric data and second binary encoded biometric bit vector for the second biometric data, wherein the first binary encoded biometric bit vector and the second binary encoded biometric bit vector each includes a set of bits of pre-defined length;

for each respective binary encoded biometric bit vector associated with the first binary encoded biometric data and the second binary encoded biometric bit vector, generating a plurality of altered binary encoded bit vectors for the respective binary encoded bit vector by varying one or more bits of the respective bit vector via a local-sensitivity hash operation, wherein a plurality of first altered binary encoded bit vectors is generated from the first binary encoded bit vector, and wherein a plurality of second altered binary encoded bit vectors is generated from the second binary encoded bit vector;

converting the plurality of first altered binary encoded bit vectors and the plurality of second altered binary encoded bit vectors to a plurality of first Hamming encoded data and a plurality of second Hamming encoded data, respectively; and storing the plurality of first Hamming encoded data and the plurality of second Hamming encoded data in a database, wherein the privacy-preserving query server assesses a closeness metric between i) the plurality of first Hamming encoded data and the plurality of second Hamming encoded data, or the first and second set of masked data generated therefrom and ii) a plurality of third Hamming encoded data, or a third set masked data generated therefrom, received from a privacy-preserving query client, wherein the closeness metric is used to determine an identifier label that is returned to the privacy-preserving query client.

15. The method of claim 14, wherein the plurality of first Hamming encoded data, the plurality of second Hamming encoded data, and the plurality of third Hamming encoded data are encrypted as the first, second, and third set of masked data, respectively.

16. The method of claim 14, wherein the closeness metric is based on a fuzzy matching operation.

17. The method of claim 14, wherein the first binary encoded bit vector is generated using a convolutional neural network or a binary code learning.

18. The method of claim 14, wherein the first biometric data and the second biometric data comprise image data.

19. The method of claim 14, wherein the plurality of third Hamming encoded data, or the third set masked data generated therefrom, are evaluated in a batch operation with other Hamming encoded data or a set of masked data generated therefrom.

20. A system comprising:
a processor; and
a memory operatively coupled to the processor and having instructions stored thereon, wherein execution of the instructions by the processor causes the processor to:
receive a first biometric data in a privacy-preserving query client to be queried in the privacy-preserving search;
generate a binary encoded biometric bit vector from the first biometric data using a binary encoding model, wherein the binary encoded biometric bit vector comprises a set of bits of pre-defined length;
generate a plurality of altered binary encoded bit vectors by varying one or more bits of the binary encoded biometric bit vector via a local-sensitivity hash operation;
convert the plurality of altered binary encoded bit vectors to a plurality of first Hamming encoded data; and
transmit a portion or all of the plurality of first Hamming encoded data associated with the first biometric data to a privacy-preserving query server operatively coupled to the database of a plurality of second biometric data, wherein each of the plurality of second biometric data has at least one corresponding identifier label, and wherein each of the plurality of second biometric data of the database had been converted a second Hamming encoded data using a second binary encoding model;
wherein the privacy-preserving query server assesses a closeness metric between the transmitted plurality of first Hamming encoded data, or a first set of masked data generated therefrom, and second Hamming encoded data of each, or a portion, of the plurality of second biometric data of the database, or a second set of masked data generated therefrom, and
wherein the closeness metric is used to determine an identifier label for a matching first and second Hamming encoded data, or the first and second set of masked data generated therefrom.

* * * * *